United States Patent
Rhyu et al.

(10) Patent No.: US 11,669,154 B2
(45) Date of Patent: Jun. 6, 2023

(54) METHOD AND DEVICE FOR REDUCING PERFORMANCE DIFFERENCE BETWEEN CONTENTS AND DEVICES IN COMMUNICATION SYSTEM

(71) Applicant: Samsung Electronics Co., Ltd., Suwon-si (KR)

(72) Inventors: Sungryeul Rhyu, Suwon-si (KR); Hakju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/446,818

(22) Filed: Sep. 2, 2021

(65) Prior Publication Data

US 2022/0066543 A1   Mar. 3, 2022

(30) Foreign Application Priority Data

Sep. 3, 2020  (KR) .......................... 10-2020-0112626

(51) Int. Cl.
*G06F 3/01* (2006.01)
*G06T 19/00* (2011.01)
(Continued)

(52) U.S. Cl.
CPC .............. *G06F 3/011* (2013.01); *G06F 3/012* (2013.01); *G06F 3/013* (2013.01); *G06F 3/14* (2013.01);
(Continued)

(58) Field of Classification Search
CPC .......... G06F 3/011; G06F 3/012; G06F 3/013; G06F 3/14; G06T 19/006; G06T 2207/30196; G09G 2360/122; H04W 4/30
See application file for complete search history.

(56) References Cited

U.S. PATENT DOCUMENTS 9,747,726 B2 * 8/2017 Williams ........... G02B 27/0179
9,858,637 B1 * 1/2018 Quach ....................... G06T 1/20
(Continued)

FOREIGN PATENT DOCUMENTS

WO        2018059934 A1    4/2018

OTHER PUBLICATIONS

International Search Report and Written Opinion of the International Searching Authority dated Dec. 1, 2021, in connection with International Application No. PCT/KR2021/011887, 7 pages.

*Primary Examiner* — Mihir K Rayan

(57) ABSTRACT

The present disclosure relates to a communication method and system for converging a 5th-Generation (5G) communication system for supporting higher data rates beyond a 4th-Generation (4G) system with a technology for Internet of Things (IoT). According to the present disclosure, a method performed by a first electronic device displaying AR content comprises obtaining measurement time information about a time when a user's pose is measured and measurement pose information about the measured pose, generating a first report including the measurement time information and the measurement pose information, transmitting the first report to a second electronic device, receiving a predicted image for a target point generated by the second electronic device, and displaying an AR image at the target point based on the predicted image.

18 Claims, 21 Drawing Sheets

(51) Int. Cl.
*G06F 3/14* (2006.01)
*H04W 4/30* (2018.01)

(52) U.S. Cl.
CPC ............ *G06T 19/006* (2013.01); *H04W 4/30* (2018.02); *G06T 2207/30196* (2013.01); *G09G 2360/122* (2013.01)

(56) References Cited

U.S. PATENT DOCUMENTS

| | | | |
|---|---|---|---|
| 10,446,119 B1* | 10/2019 | Lakshmikantha ... | H04N 19/436 |
| 10,754,537 B2* | 8/2020 | Park ................. | H04N 21/41407 |
| 2007/0222779 A1* | 9/2007 | Fastert ..................... | G06T 1/00 |
| | | | 345/418 |
| 2010/0091770 A1* | 4/2010 | Ishikawa ................ | H04L 47/20 |
| | | | 370/389 |
| 2014/0120887 A1* | 5/2014 | Huang .................. | H04L 67/131 |
| | | | 455/414.1 |
| 2014/0225923 A1 | 8/2014 | Huang | |
| 2015/0029218 A1 | 1/2015 | Williams et al. | |
| 2016/0134874 A1* | 5/2016 | Konieczny ........... | H04N 19/136 |
| | | | 375/240.08 |
| 2016/0364904 A1* | 12/2016 | Parker ..................... | G06F 3/038 |
| 2017/0155885 A1* | 6/2017 | Selstad ................ | H04N 13/341 |
| 2018/0075820 A1* | 3/2018 | Hicks ........................ | G06F 3/14 |
| 2018/0146189 A1* | 5/2018 | Park ..................... | H04N 13/344 |
| 2019/0012826 A1* | 1/2019 | Melkote Krishnaprasad .............. | |
| | | | G06T 7/50 |

* cited by examiner

METHOD AND DEVICE FOR REDUCING PERFORMANCE DIFFERENCE BETWEEN CONTENTS AND DEVICES IN COMMUNICATION SYSTEM

CROSS-REFERENCE TO RELATED APPLICATION

This application is based on and claims priority under 35 U.S.C. § 119 to Korean Patent Application No. 10-2020-0112626, filed Sep. 3, 2020, in the Korean Intellectual Property Office, the disclosure of which is herein incorporated by reference in its entirety.

BACKGROUND

1. Field

The disclosure relates to content processing, and more particularly, to a method and device for processing immersive content in a communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

SUMMARY

The disclosure provides a method and device capable of effectively reduce a performance difference between contents and devices in a communication system.

According to an embodiment, a method performed by a first electronic device displaying augmented reality (AR) content comprises obtaining measurement time information about a time when a user's pose is measured and measurement pose information about the measured pose, the measurement pose information including the user's location and gazing direction, generating a first report including the measurement time information and the measurement pose information, transmitting the first report to a second electronic device, receiving a predicted image for a target point generated by the second electronic device, the predicted image for the target point generated based on the first report, and displaying an augmented reality (AR) image at the target point based on the predicted image. The first report may further include capability information related to an image processing time of the first electronic device.

According to an embodiment, a method performed by a second electronic device rendering augmented reality (AR) content comprises receiving, from a first electronic device, a first report including measurement time information about a time when a user's pose is measured and measurement pose information about the measured pose, the measurement pose information including the user's location and gazing direction, determining a target point when an AR image is displayed, based on the first report, generating a predicted image for the target point, based on the first report, and transmitting data of the predicted image and the target point to the first electronic device. The first report may further include capability information related to an image processing time of the first electronic device.

According to an embodiment, a first electronic device displaying augmented reality (AR) content comprises a transceiver, a display, and a controller connected with the transceiver. The controller is configured to obtain measurement time information about a time when a user's pose is measured and measurement pose information about the measured pose, the measurement pose information including the user's location and gazing direction, generate a first report including the measurement time information and the measurement pose information, transmit the first report to a second electronic device, receive a predicted image for a target point generated by the second electronic device, the predicted image for the target point generated based on the first report, and display an AR image at the target point based on the predicted image. The first report may further include capability information related to an image processing time of the first electronic device.

According to an embodiment, a second electronic device rendering augmented reality (AR) content comprises a transceiver, a display, and a controller connected with the transceiver. The controller is configured to receive, from a first electronic device, a first report including measurement time information about a time when a user's pose is measured and measurement pose information about the measured pose, the measurement pose information including the user's location and gazing direction, determine a target point when an AR image is displayed, based on the first report, generate a predicted image for the target point, based on the first report, and transmit data of the predicted image and the target point to the first electronic device. The first report may further include capability information related to an image processing time of the first electronic device.

According to an embodiment, a processing time of the whole or specific processing is recorded and reported for processes executed for mutual operation between an AR terminal and a server including a content processing device. In this case, the processing time of the process executed by the terminal and the server and the time required for transmission over the data network are separately processed. To reduce the time required for transmission, the type of process and the processing method are changed or, to reduce the processing time of the process, the transmission method is changed.

According to an embodiment, the content processing device includes a plurality of projection devices or a plurality of content simplification devices. To uniformly operate the performance of one processing device, the complexity of the process that needs to be processed by the processing devices from the initial-stage processing device to the processing devices right before the one processing device is determined. To that end, the system allows the processing device to determine the complexity of the processing method and the type of process based on the transmission processing performance of the data network and the processing performance required for content, and the performance of each terminal and the server as disclosed herein.

According to an embodiment, as the content simplification device, a device for reducing the complexity of 3D or 2D content or a device for clipping part of 3D or 2D content is considered. The simplification device determines the type of process and the processing direction considering the complexity of content and the performance of the next and subsequent processing devices, and the performance of data network therebetween. For example, the next device may treat 3D images. If the device is able to reproduce 100000 points, a point cloud image having one million points may be reduced into 100000 points while remaining in shape to reduce the complexity of 3D content. If the next device is able to treat 2D images and reproduce 4K content, the 3D content may be rendered into 2D 8K content, and the 8K content is downscaled into 4K content and transmitted, thereby reducing the processing performance required for the next device. For example, in the case of partial clipping for complicated 3D building information, only information about a room the user desires to experience is clipped or, of a 360-degree surrounding image, only the direction the user is gazing may be clipped and transmitted, thereby reducing the processing target for the next device.

According to an embodiment, the system includes a prediction device for predicting the user's future location and gazing direction. The prediction device operates a plurality of prediction models and transmits a plurality of prediction results in preparation for inconsistent prediction in the final step. Among all the prediction values of all the prediction models, some are chosen based on a plurality of selection criteria, and the processing results, which are based on the chosen prediction values, may be configured based on the selection criteria and may simultaneously be transmitted.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Figure 1A:
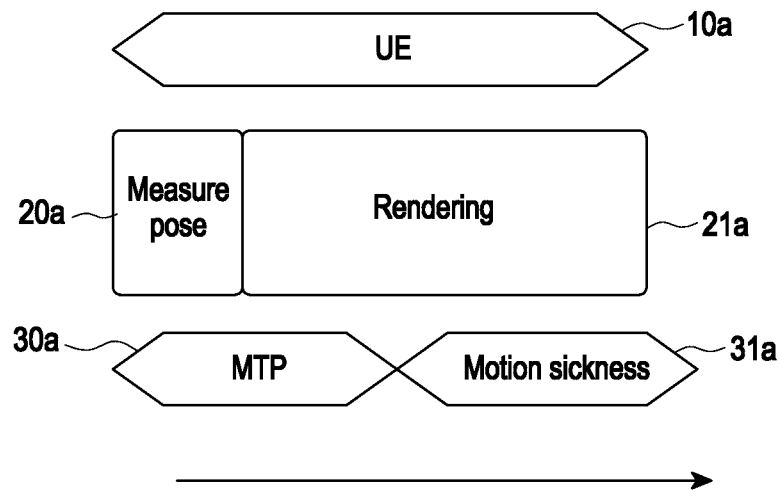
FIGS. 1A, 1B, and 1C illustrate an exemplary content processing system.

FIGS. 1 through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, embodiments of the present disclosure are described in detail with reference to the accompanying drawings.

In describing the embodiments, the description of technologies that are known in the art and are not directly related to the present disclosure is omitted. This is for further clarifying the gist of the present disclosure without making it unclear.

For the same reasons, some elements may be exaggerated or schematically shown. The size of each element does not necessarily reflect the real size of the element. The same reference numeral is used to refer to the same element throughout the drawings.

Advantages and features of the present disclosure, and methods for achieving the same may be apparent from the embodiments described below with reference to the accompanying drawings. However, the present disclosure is not limited to the embodiments disclosed herein, and various changes may be made thereto. The embodiments disclosed herein are provided only to inform one of ordinary skilled in the art of the category of the present disclosure. The present disclosure is defined only by the appended claims. The same reference numeral denotes the same element throughout the specification.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction means for performing the functions described in connection with a block(s) in each flowchart. Since the computer program instructions may be equipped in a computer or other programmable data processing devices, instructions that generate a process executed by a computer as a series of operational steps are performed over the computer or other programmable data processing devices and operate the computer or other programmable data processing devices may provide steps for executing the functions described in connection with a block(s) in each flowchart.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more CPUs in a device or a security multimedia card. According to embodiments of the disclosure, a " . . . unit" may include one or more processors.

Hereinafter, the operational principle of the disclosure is described below with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Hereinafter, embodiments of the present disclosure are described in detail with reference to the accompanying drawings. Although 5G system is described in connection with embodiments of the present disclosure, as an example, embodiments of the present disclosure may also apply to other communication systems with similar technical background or channel form. For example, LTE or LTE-A mobile communication and post-5G mobile communication technology (e.g., 6G system) may be included therein. Further, embodiments of the present disclosure may be modified in such a range as not to significantly depart from the scope of the present disclosure under the determination by one of ordinary skill in the art and such modifications may be applicable to other communication systems.

When determined to make the subject matter of the present disclosure unclear, the detailed description of the known art or functions may be skipped. The terms as used herein are defined considering the functions in the present disclosure and may be replaced with other terms according to the intention or practice of the user or operator. Therefore, the terms should be defined based on the overall disclosure.

The disclosure may be associated with technologies for processing immersive content, e.g., split rendering, augmented reality (AR)/mixed reality (MR)/extended reality (XR), service/media/content/device, encoding/decoding, reprojection, three-dimensional (3D) graphics, rasterization, edge computing, cloud computing, and/or cloud gaming technologies.

FIG. 1 illustrates an exemplary content processing system.

The content processing system of FIG. 1 may be, e.g., a content processing system for processing AR content.

The content processing system of FIG. 1 may include an AR terminal (device) 10a (e.g., a device, AR glasses or head mounted display (HMD)), which mixes the user's real world and virtual content and represents them to allow the user to feel as if a virtual object indeed exists) and a projection device (e.g., a renderer) that outputs AR content or converts AR content to fit the output of the AR terminal 10a. In this disclosure, the AR terminal 10a may be referred to as a user equipment (UE) or AR UE.

FIG. 1A illustrates an example of a content processing system that performs rendering using only a projection device in an AR terminal 10a. The AR terminal 10a of the embodiment of FIG. 1A may be a standalone AR terminal which alone may perform rendering.

In the content processing system as illustrated in FIG. 1A, when the performance of the projection device in the AR terminal 10a is sufficiently high, that is, when AR content may be converted according to the user's motion and gazing direction, the user may not distinguish between the real world and virtual objects. However, if motion to photon (MTP), i.e., the time required to generate a photon, which is the output of light represented on the display for the user's motion, e.g., tiny or fast motion, exceeds certain duration (e.g., 10 ms), a discrepancy may occur between the user's motion and the position of the virtual object's representation, resulting in a reduced sense of immersion. For example, as illustrated in FIG. 1A, if the time of pose measurement (21a) and rendering (21a) of AR content associated with the measured pose information by the AR terminal (UE) 10a exceeds the MTP duration (30a), motion sickness (31a) may occur.

To meet the MTP, a projection device may be prepared by installing an application on a separate high-performance personal computer (PC) and may be connected to the AR terminal. However, processing various use cases is limited because the AR terminal operates only within a predetermined location from the PC.

Meanwhile, with the advent of communication technology that provides high transmission speed and low latency, such as 5G, a projection device may be included in a cloud or a mobile edge computing (MEC) server, and the results processed by such a high-performance server may be transmitted to an AR terminal so as to meet the MTP. This method is called the split rendering method in the sense that rendering is processed separately by the server and the terminal.

Figure 1B:
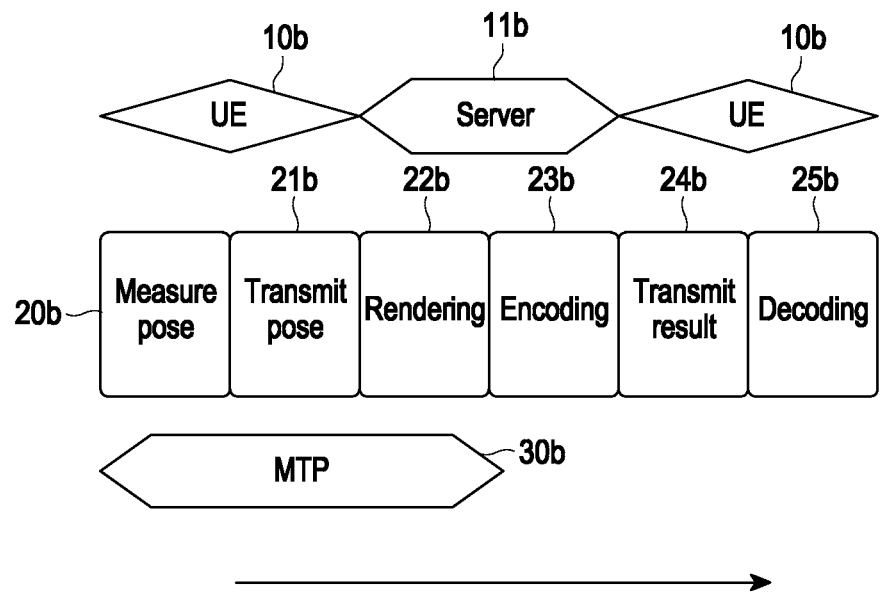

FIG. 1B illustrates an example of a content processing system that performs split rendering. In the embodiment of FIG. 1B, the AR terminal 10b may be a server-dependent AR terminal in which rendering is split and performed by the AR terminal and the server.

Referring to FIG. 1B, the AR terminal (UE) 10b may measure (20b) a pose and transmit (21b) the measured pose information to the server 11b (e.g., a cloud or MEC server). The server 11b may render (22b) AR content associated with the measured pose information, encode (23b) the AR content, and transmit (24b) the resultant data to the AR terminal (UE) 10b. The AR terminal (UE) 10b may decode (25b) the resultant data and display the AR content.

However, since there are a plenty of contents that require too high a performance to meet MTP despite processing by the server, the time during which the position/orientation information obtained from the AR terminal is received and the results of processing by the server arrive may be later than the MTP requirement. For example, as illustrated in FIG. 1B, the decoding completion time of the AR terminal may be after the MTP duration (30b). Accordingly, there are provided methods (techniques) of predicting the user's future position in light of the foregoing. In other words, if the MTP of a certain system is 100 ms and the MTP requirement to be met is 10 ms, the user's position and orientation (pose) after 100 ms are predicted, and projection is performed and the result is transmitted. If the prediction is accurate, the MTP is met. This method is called asynchronous time warping (ATW) in the sense of predicting time.

Further, in case prediction is not accurate, there is provided an additional method (technique) a method (technique) that projects a predicted image based on the projection information at the prediction point and the projection information at the actual point. This method is called late stage reprojection in the sense that reprojection is performed in the final stage.

Figure 1C:
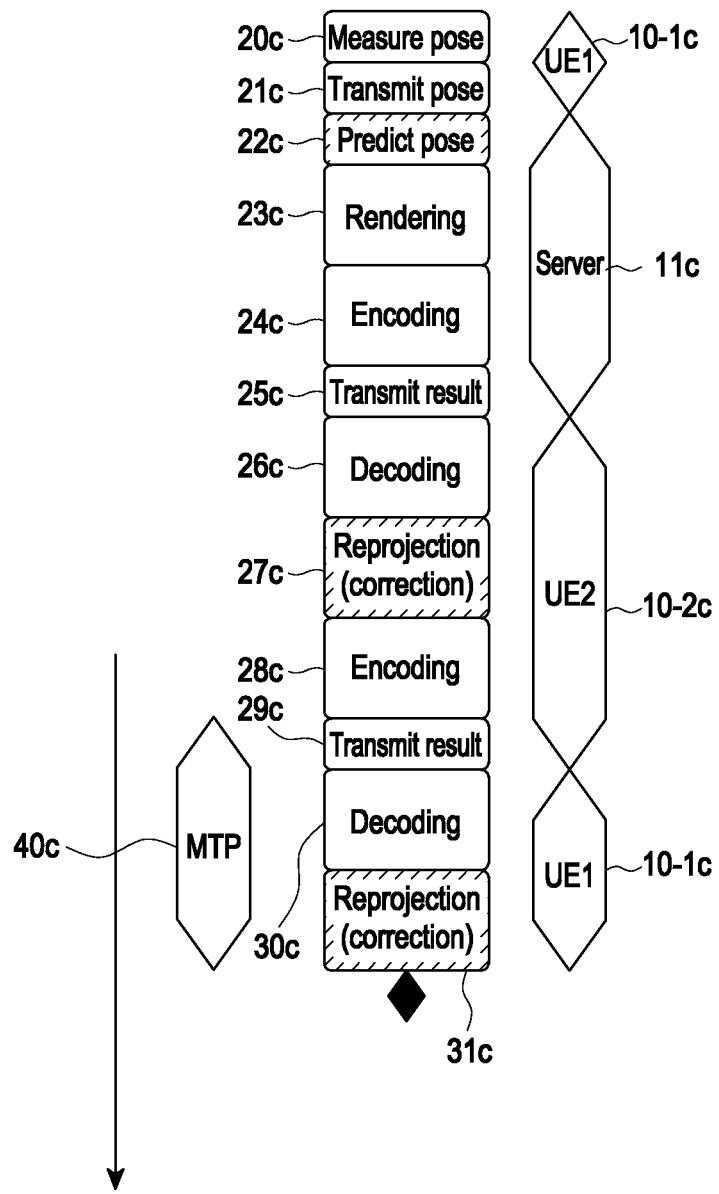

FIG. 1C illustrates an example of a content processing system using ATW and late stage reprojection technology. In the embodiment of FIG. 1C, the AR terminal (UE1) 10-1c may be a server-dependent AR terminal in which rendering is split and performed by the AR terminal and the server.

In the embodiment of FIG. 1C, the content processing system may include a terminal (UE2) 10-2c having a function of correcting (reprojecting) the AR content processed by the server between the AR terminal (UE1) 10-1c and the server 11c. As an embodiment, the terminal (UE2) 10-2c may be a tethered terminal (e.g., a mobile phone) connected with the AR terminal (UE1) 10-1c by tethering. In this case, the AR terminal (UE1) 10-1c may communicate with the server through the tethered UE.

Referring to FIG. 1C, the AR terminal (UE1) 10-1c may measure (20c) a pose and transmit (21c) the measured pose information to the server 11c (e.g., a cloud or MEC server). The server 11c may predict (22c) the pose based on the measured pose information, render (23c)/encode (24c) AR content associated with the predicted pose information, and transmit (25c) the resultant data (first resultant data) to the terminal (UE2) 10-2c. The terminal (UE2) 10-2c may decode (26c), correct (27c) (reproject), and encode (28c) the first resultant data and transmit (29c) the resultant data (second resultant data) to the AR terminal (UE1) 10-1c. The AR terminal (UE1) 10-1c may decode (30c) and correct (31c) the second resultant data and display the AR content. Therefore, the AR content may be displayed within the MTP requirement/duration (40c).

An example configuration of a content processing system according to the disclosure is described below. The content processing system of the disclosure may be, e.g., an AR content processing system for providing AR content.

The content processing system of the disclosure may include components, such as an AR display device for representing an AR effect, one or more AR content processing devices for generating an AR effect, and a plurality of heterogeneous data networks and/or homogeneous data networks for transmitting the AR effect. In the disclosure, the AR content processing device may be referred to as an AR content processor.

The AR display device may capture the user's real world, grasp the user's motion via, e.g., an image, depth, and motion sensor, and represent an AR effect on the real world image according to the user's motion, as does, e.g., glasses, HMD, optical see through HMD, or mobile terminal.

The AR content processing device converts AR content into an AR effect represented on the AR display. The AR effect refers to, e.g., rendering of two dimensional (2D) or three dimensional (3D) AR content into a 2D image viewed from a specific position and conversion operations related thereto. The conversion operations may include, e.g., parsing, decoding, encoding, rendering, transcoding, partial accessing, reprojecting, and/or compression of AR content. As an embodiment, the AR content processing device may be included in the AR display device.

A prediction model may predict the target point/target time (point of time) where/when the AR effect generated by the server is to be displayed on the AR display device and the user's position and gazing direction predicted at the target point/target time based on the user's motion from the past to the present, the position of the AR content in the virtual space, the user's position in the virtual space, the user's eye gaze location information, the processing time of the process executed by the terminal and the server, and/or time required for transmission over the data network.

Further, the AR content processing device may perform the whole or part of the AR content conversion operation considering the AR effect processing performance of the AR display device and other AR content processing devices.

The data network may transmit the user motion information obtained from the AR display device to the AR content processing device and transmit the AR effect generated by the AR content processing device to a next AR content processing device or AR display device. An example system communication protocol method for more precise prediction is described below with reference to FIGS. 2 and 3. A process for AR effect generation and transmission, as provided in the content processing system of the disclosure, may be operated as illustrated in FIGS. 2 and 3, for example.

Figure 2:
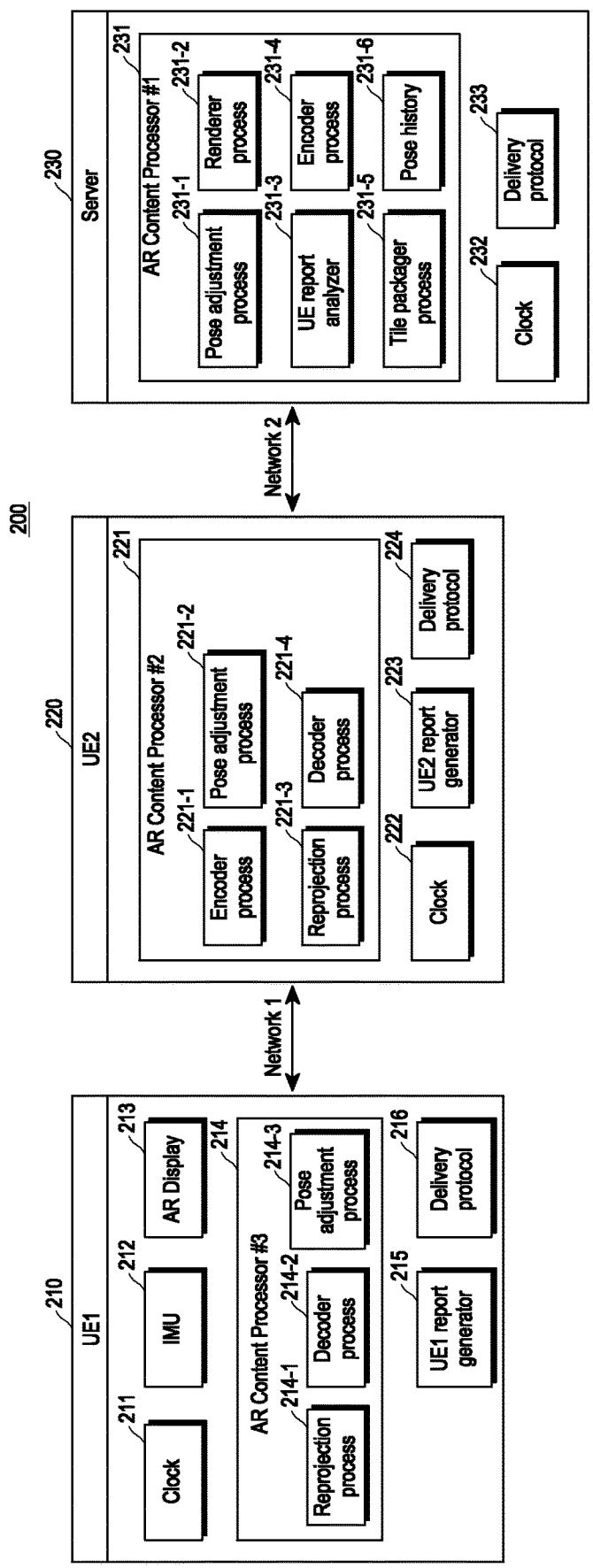
FIG. 2 illustrates a configuration of a content processing system according to an embodiment of the disclosure.
Figure 3:
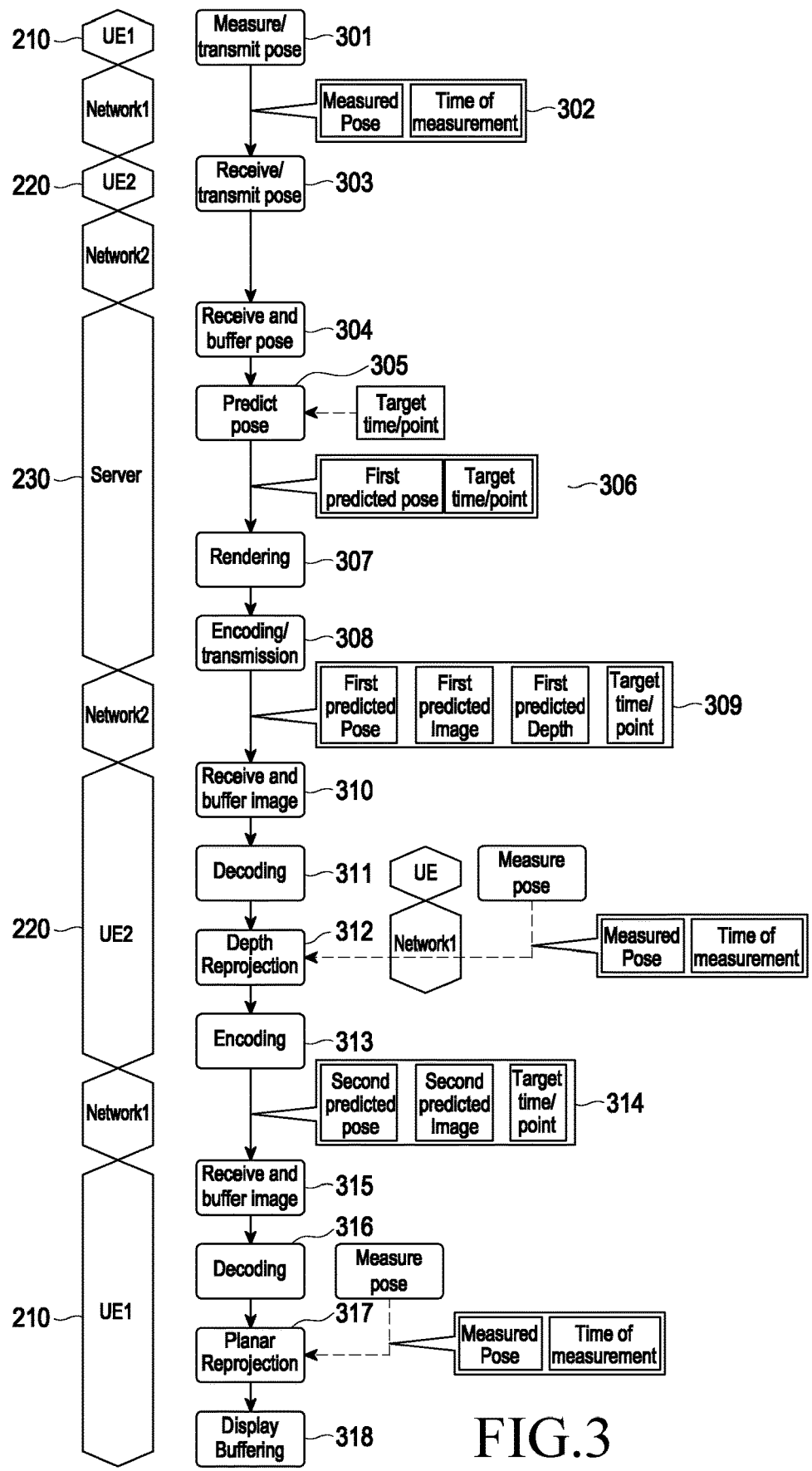
FIG. 3 illustrates a content processing procedure of a content processing system according to an embodiment of the disclosure.

FIG. 2 illustrates a configuration of a content processing system according to an embodiment of the disclosure.

The content processing system of the disclosure may include a plurality of electronic devices including AR content processing devices. The plurality of electronic devices may include, e.g., a plurality of user equipment (UEs) 210, 220 and one server 230, as illustrated in FIG. 2. Alternatively, the plurality of electronic devices may include one UE 210 and one server 230. Alternatively, the plurality of electronic devices may include a plurality of UEs 210, 220.

Among the plurality of electronic devices, one electronic device (e.g., the UE1 210 of FIG. 2) corresponds to an AR display and an electronic device (first electronic device) obtaining/transmitting pose information, and another electronic device (e.g., the server 230 of FIG. 2) corresponds to an electronic device (second electronic device) performing prediction processing on the pose and image at the target point based on the pose information received from the first electronic device. In the present disclosure, a target point is a point of time (time point) indicating a target time and/or a point of view (viewpoint) of a user at the target time. Hereinafter, various embodiments of the present disclosure will be described by exemplifying a case in which a target point is a target time (point of time), but even in case of a target viewpoint (point of view), the corresponding explanation can be applied identically or similarly.

Various embodiments of the disclosure are described based on, e.g., a system configuration in which the plurality of electronic devices include a third electronic device (e.g., the UE2 210 of FIG. 2), located between the first electronic device and the second electronic device, as well as the above-described first electronic device (e.g., the UE1 210 of FIG. 2) and the above-described second electronic device (e.g., the server 230 of FIG. 2) as illustrated in FIG. 2. However, it is apparent to one of ordinary skill in the art that various embodiments described below may also be applied to system configurations in which the plurality of electronic devices include the above-described first electronic device and second electronic device but not include the above-described third electronic device, by omitting and changing some operations and/or information.

In the embodiment of FIG. 2, the UE1 210 may be, e.g., an AR terminal, and the UE2 220 may be, e.g., a tethered terminal (e.g., a mobile phone) tethered with the AR terminal. The server 230 may be, e.g., a cloud server or an MEC server.

Referring to FIG. 2, the content processing system 200 may include a UE1 210, a UE2 220, and a server 230. The UE1 210 and the UE2 220 may be connected through a first network network1, and the UE2 220 and the server 230 may be connected through a second network network2. In this case, the first network and the second network may be heterogeneous communication networks but, alternatively, may be homogeneous networks according to an embodiment. In this disclosure, UE1 210 may be referred to as a first UE, and UE2 220 may be referred to as a second UE.

In an example embodiment, the UE1 210 may include at least one component for supporting AR services. For example, the UE1 210 may include at least one of a clock 211, at least one motion sensor (e.g., an inertial measurement unit (IMU)) 212, an AR display 213, a third AR content processing device (AR content processor #3) 214, a first report generator (UE1 report generator) 215, or a delivery protocol 216. As an embodiment, the third AR content processing device 214 may include one or more processes (e.g., a reprojection process 214-1, a decoder process 214-2, and/or a pose adjustment process 214-3). In this case, each process may perform a predetermined function/operation using hardware and/or software.

In an example embodiment, the UE2 220 may include at least one component for supporting AR services. For example, the UE2 220 may include at least one of a second AR content processing device (AR content processor #2) 221, a clock 222, a second report generator (UE2 report generator) 223, or a delivery protocol 224. As an embodiment, the second AR content processing device 221 may include one or more processes (e.g., an encoder process 221-1, a pose adjustment process 221-2, a reprojection process 221-3, and/or a decoder process 221-4). In this case, each process may perform a predetermined function/operation using hardware and/or software.

In an example embodiment, the server 230 may include at least one component for supporting AR services. For example, the server 230 may include at least one of a first AR content processing device (AR content processor #1) 231, a clock 232, or a delivery protocol 233. As an embodiment, the first AR content processing device 231 may include one or more processes (e.g., a pose prediction process 231-1, a renderer process 231-2, a UE report analyzer 231-3, an encoder process 231-4, a tile package process 231-5, and/or a pose history process 231-6). In this case, each process may perform a predetermined function/operation using hardware and/or software.

Detailed operations of the UE1 210, the UE2 220, the server 230, and the components of each device are described below with reference to FIG. 3.

FIG. 3 illustrates a content processing procedure of a content processing system according to an embodiment of the disclosure. Referring to FIG. 3, an example of processing between UEs and a server is described below.

In operation 301, the UE1 210 may measure the user's pose (i.e., the user's position and orientation (gazing direction)).

In operation 302, the measured (actually measured) pose and the measurement time (time of the measurement) may be transferred to the UE2 220 through the first network. For example, the UE1 210 may include information for the measured pose and measurement time, as pose information (data), in a UE1 report to be described below with reference to FIG. 6, using the first report generator 215. The UE1 210 may transmit the UE1 report including the pause information to the UE2 via the first network using the delivery protocol 216. Such the pose data (information) may be periodically measured and transmitted through the UE1 report.

In operation 303, the UE2 220 may transmit the received data to the server through the second network. For example, the UE2 220 may include the whole or part of the data included in the received UE1 report in a UE2 report, described below with reference to FIG. 7, using the second report generator 223. The UE2 220 may transmit the UE2 report to the server via the second network, using the delivery protocol 224. As an embodiment, the UE2 report may be transmitted periodically upon periodic reception of the UE1 report.

In operation 304, the server 230 may operate a buffer considering the stability of the first network and the second network and store the pose data in the buffer as the pose data is received, and then read in and transfer the pose data to the prediction model (pose prediction process) every predetermined interval (e.g., every frame) and per period (e.g., from the present to m pose data records before). For example, the server 230 may obtain data of poses according to preset criteria from the periodically received UE2 reports and/or UE1 reports and transfer the data to the prediction model.

In operation 305, the prediction model (or the server 230) may predict an action to be taken by the user or her position at a time after n frames, which is a target time (prediction time), from the received poses.

Figure 4:
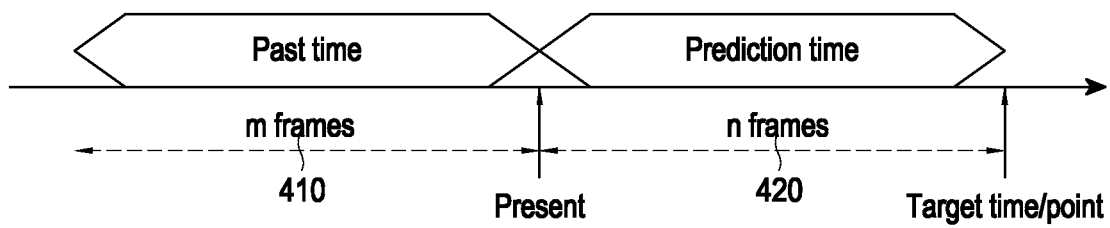
FIG. 4 illustrates an example of a time period related to pose prediction according to an embodiment of the disclosure.

In operation 306, the prediction model (or the server 230) may accordingly generate a predicted pose (i.e., the predicted user's position and orientation (gazing direction)) and transfer the predicted pose, along with the target time information, to the first AR content processing device 231. In the disclosure, the predicted pose generated by the server 230 may be referred to as a first predicted pose. FIG. 4 illustrates an example of a time period related to pose prediction according to an embodiment of the disclosure. Referring to FIG. 4, the prediction model of the server 230 (or the server 230) may obtain data of poses from the present to m frames (410) before and, based thereupon, generate a predicted pose at the target time which is n frames (420) after the current time.

In operation 307 (rendering), the first AR content processing device 231 (or the server 230) may generate an AR effect appropriate for the corresponding position and gazing direction by using the predicted pose as an input. For example, the first AR content processing device 231 (or the server 230) may generate an AR effect (first predicted image) based on the predicted pose using the renderer process 231-2.

The generated AR effect may generally be in the form of a 2D video (e.g., 2D image) but encompasses cases in which complex 3D AR content is converted into simplified 3D AR content (e.g., 3D image). Accordingly, the size of the AR effect including the simplified 3D AR content generally exceeds a range in which real-time reproduction is possible as compared to the transmission bandwidth of the data network.

Accordingly, the generated AR effect may be compressed to fall within the range in which real-time reproduction is possible as compared to the transmission bandwidth of the data network, and then compressed bitstreams may be transferred to the UE2 through the second network. For example, in operation 308, the server 230 may compress the generated AR effect using the encoder process 231-4 and, in operation 309, the server 230 may transfer the compressed bitstreams (data) to the UE2 220 through the second network using the delivery protocol 233.

As an embodiment, the transferred bitstream may include the first predicted image generated by the first AR content processing device 231, the first predicted pose used for the purpose, and data at the target time/target point. Further, the transferred bitstream may further include additional data for processing in the second AR content processing device 221. The additional data may include, e.g., depth map, mesh, outline, occlusion, and the like. In the disclosure, the data transferred from the server 230 to the UE2 220 may be referred to as first transmission data (transmission data 1) and first result data.

In operations 310, 311, and 312, the UE2 220 may operate a buffer for receiving and storing the first predicted image and/or additional data (information) (or first result data) and may store data in the buffer as the data is received, decompress the data, and convert the data into a form easy to be processed by the third AR content processing device 214 of the UE1 210 which is the next AR content processing device. For example, the UE2 220 may decompress the data stored in the buffer using the decoder process 221-4 and perform depth reprojection based on the above-described additional data using the reprojection process 221-3. In this case, the updated latest pose information received from the UE1 210 through the first network may be used to correct the first predicted pose and generate a second predicted pose, and based thereupon, the depth reprojection may be performed. Therefore, the second predicted image and data of the second predicted pose associated therewith may be generated and transmitted to the UE1 210.

In operation 313, the UE2 220 may compress the data processed in operations 310, 311, and 312 using the encoder process 221-1 and, in operation 314, the UE2 220 may transmit the compressed data to the UE1 210 using the delivery protocol 224. As an embodiment, the data transferred from the UE2 220 to the UE1 210 may include information for the second predicted pose, the second predicted image, and/or the target time/target point. In the disclosure, the data transferred from the UE2 220 to the UE1 210 may be referred to as second transmission data (transmission data 2) and second result data.

In operations 315, 316, and 317, the UE1 210 may operate a buffer for receiving and storing the second predicted image (or the second result data) and may perform processing for storing data in the buffer as the data is received and displaying the data. For example, the UE1 210 may decompress the data stored in the buffer using the decoder process 214-2 and perform planar reprojection using the reprojection process 214-1. In this case, the updated latest pose information may be used to correct the second predicted pose and, based thereupon, the planar reprojection may be performed. Thus, the corrected image may be displayed.

In operation 318, the UE1 210 may store the data processed in operations 315, 316, and 317 in the buffer for display. Thereafter, the UE1 210 may display an AR effect appropriate for the target time/target point.

Meanwhile, when the UE1 210 finally receives the AR effect, a difference may occur between the pose predicted by the prediction model of the server 230 and the final measured pose. In the disclosure, the difference is referred to as a prediction spatial error. Also, a difference may occur between the target time/target point predicted by the prediction model of the server 230 and the final measurement time to use the actual AR effect. In the disclosure, this difference is referred to as a prediction time error. Preferably, the AR content processing device provides additional information (e.g., a depth map for three-dimensional spatial error correction) that may minimize the error in the next AR content processing device.

Meanwhile, as described above, the first network between UE1 and UE2 and the second network between UE2 and the server in FIG. 2 may be heterogeneous networks. For example, the UE1 210 is connected to the UE2 220 through the first network in a short distance, and the UE2 220 and the server 230 may be connected through the second network in a long distance. Examples of the first network may include a direct wired connection, Bluetooth or wireless fidelity (Wi-Fi), and examples of the second network may include long-term evolution (LTE), fifth generation (5G), or sixth generation (6G). By the transmission amount and latency characteristics of heterogeneous networks, it is preferable that conversion from the server 230 to the UE2 220 is provided with additional data (e.g., depth map) by which a relatively large time difference may be overcome, and conversion from the UE2 220 to the UE1 210 is provided with additional data (e.g., a location range capable of planar reprojection for correcting the planar spatial error) by which a relatively short time difference may be overcome. The above-described additional data provided by the server 230 is an example of information to be used by the UE2 220 to minimize the error.

In the embodiment of FIG. 3, the second AR content processing device 221 of the UE2 220 overcomes the prediction spatial error using the 3D spatial information of the AR effect. For example, the second content processing device 221 may infer the spatial relationship of the image by combining the image (the first predicted image) and the depth map information or mesh information and correct (depth reprojection) the image based on the spatial relationship of the image. The third AR content processing unit 214 of the UE1 210 may use planar reprojection for the image to correct a small amount of prediction spatial errors caused for a relatively short time from the errors corrected by the second AR content processing device 221. In other words, it is preferable to infer the size of error predicted depending on the latency characteristics and transmission bandwidth performance of the data network and use different AR effect correction methods depending on error sizes.

To this end, it is necessary to identify and share a history of all the time required for processing and transmission between one AR content processing device and another AR content processing device. This is because it is preferable to select different data and different methods for overcoming the prediction spatial error and prediction time error for a case where the process is relatively time-consuming and the transmission time of the data network is short and the opposite case where the process is simple and the transmission time of the data network is long. The temporal or spatial size that may be overcome by each error overcoming method, the system performance requirement for the process for generating the same, the histories of time required in the same process in different systems, and the system performance requirement for the process to overcome the error using the data generated by the process need to be identified.

In the content processing system (e.g., AR system) for providing an AR effect using AR content, if AR displays with different performances and mobile terminals (e.g., UE1 and UE2) including AR content processing devices with different performances access the same server via different data networks, the AR content processing device operating on the server determines the processes of the AR content processing devices considering the path to the final AR display, the performance of the terminal on the path, and data network transmission characteristics on the path.

For example, if the transmission time of the data network is long (e.g., when the transmission time of the data network is longer than a preset first reference time), the user's motion widens during reception and, thus, additional data for correcting the prediction result needs to contain information capable of correcting the user's 3D motion, e.g., up, down, left, and right.

As another example, if the transmission time of the data network is short (e.g., when the transmission time of the data network is shorter than the preset first reference time), the user's motion during reception is highly likely to have a linear motion direction from the prediction and the additional data thus needs to include information capable of calibrating an increase or decrease in the moving path including the predicted linear motion.

An example method for grasping a processing time and data network transmission time to determine the type of processing (process) and the type of processing for each UE/server as described above is described with reference to FIG. 5.

Figure 5:
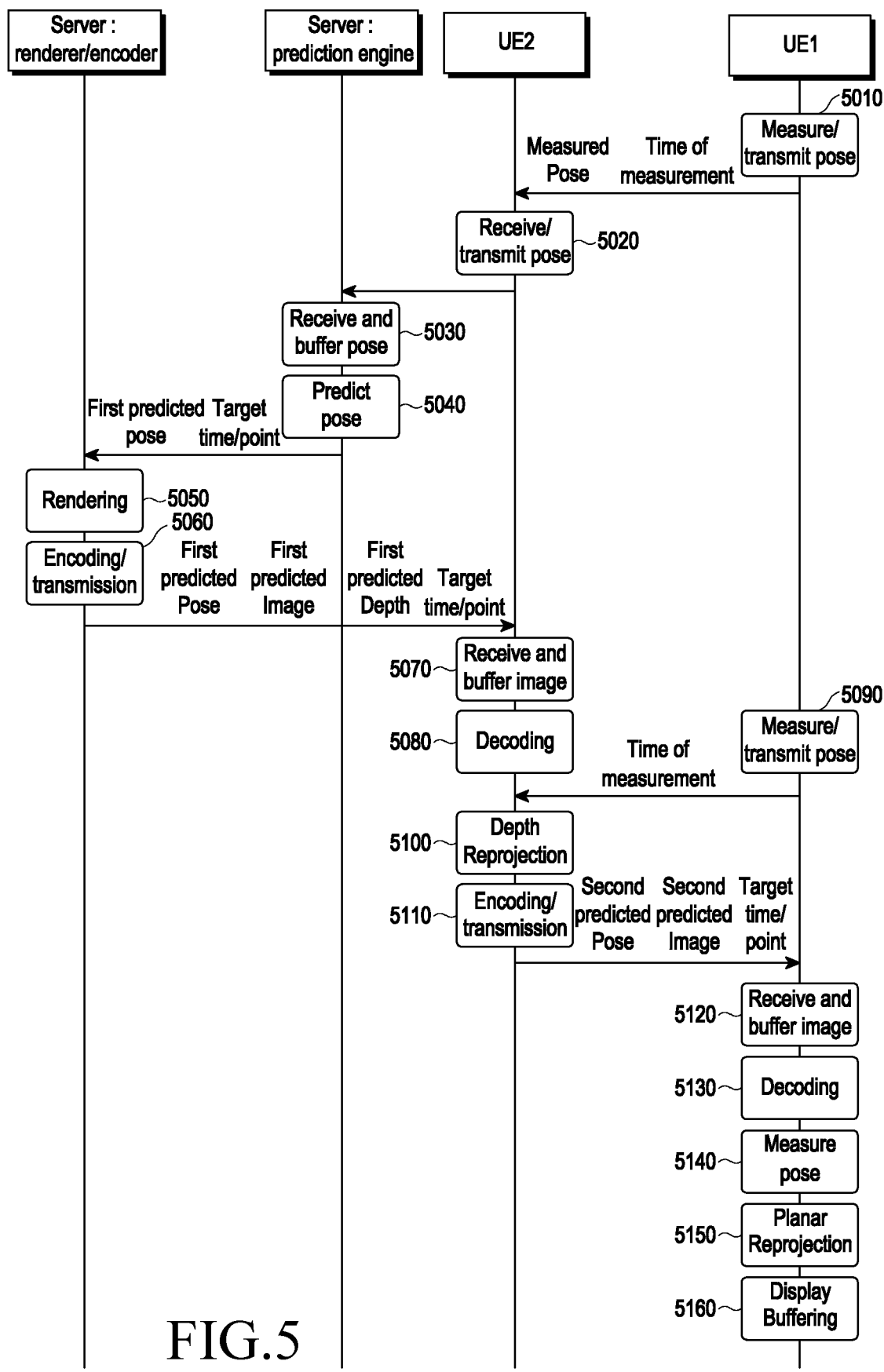
FIG. 5 illustrates a content processing procedure using a time component of a content processing system according to an embodiment of the disclosure.

FIG. 5 illustrates a content processing procedure using a time component of a content processing system according to an embodiment of the disclosure.

In the embodiment of FIG. 5, a content processing system may include a UE1, a UE2, and a server. The server may include a prediction engine (model) and a renderer (renderer process)/encoder (encoder process). The content processing system and components of FIG. 5 may correspond to, e.g., the content processing system and components described above with reference to FIG. 2.

Referring to FIG. 5, UE1 may measure the user's pose and transmit the measured pose and measurement time data to UE2 (5010). In this case, as described above, the measured pose and the measurement time data, as pose information (data), may be included in a UE1 report and transmitted. UE2 may transmit the received data to the server (5020). In this case, as described above, all or part of the data of the UE1 report may be included in a UE2 report generated by the UE2 and transmitted. The data transmitted to the server may be stored in the server's buffer and be transferred to the prediction engine of the server (5030).

Meanwhile, for example, if the procedure illustrated in FIG. 5 is performed, the difference between the "current time" at which the server receives the UE1's measurement time information and the "measurement time" of the information transmitted by UE1 may be the sum of a first time period during which UE1 measures the pose and initiates transmission, a second time period resultant from dividing a first pose data size (pose data size 1) transferred from UE1 to UE2 by the bandwidth (prediction bandwidth1) of the first network, a third time period during which UE1 receives the pose and initiates transmission, and a fourth time period resultant from dividing a second pose data size (pose data size 2) transferred from UE2 to the server by the bandwidth (prediction bandwidth2) of the second network. This may be represented, e.g., by Equation 1 below.

Current time−measurement time=UE1 processing+
(pose data size 1/prediction bandwidth1)+UE2
processing+(pose data size 2/prediction bandwidth2).   [Equation 1]

Figure 6:
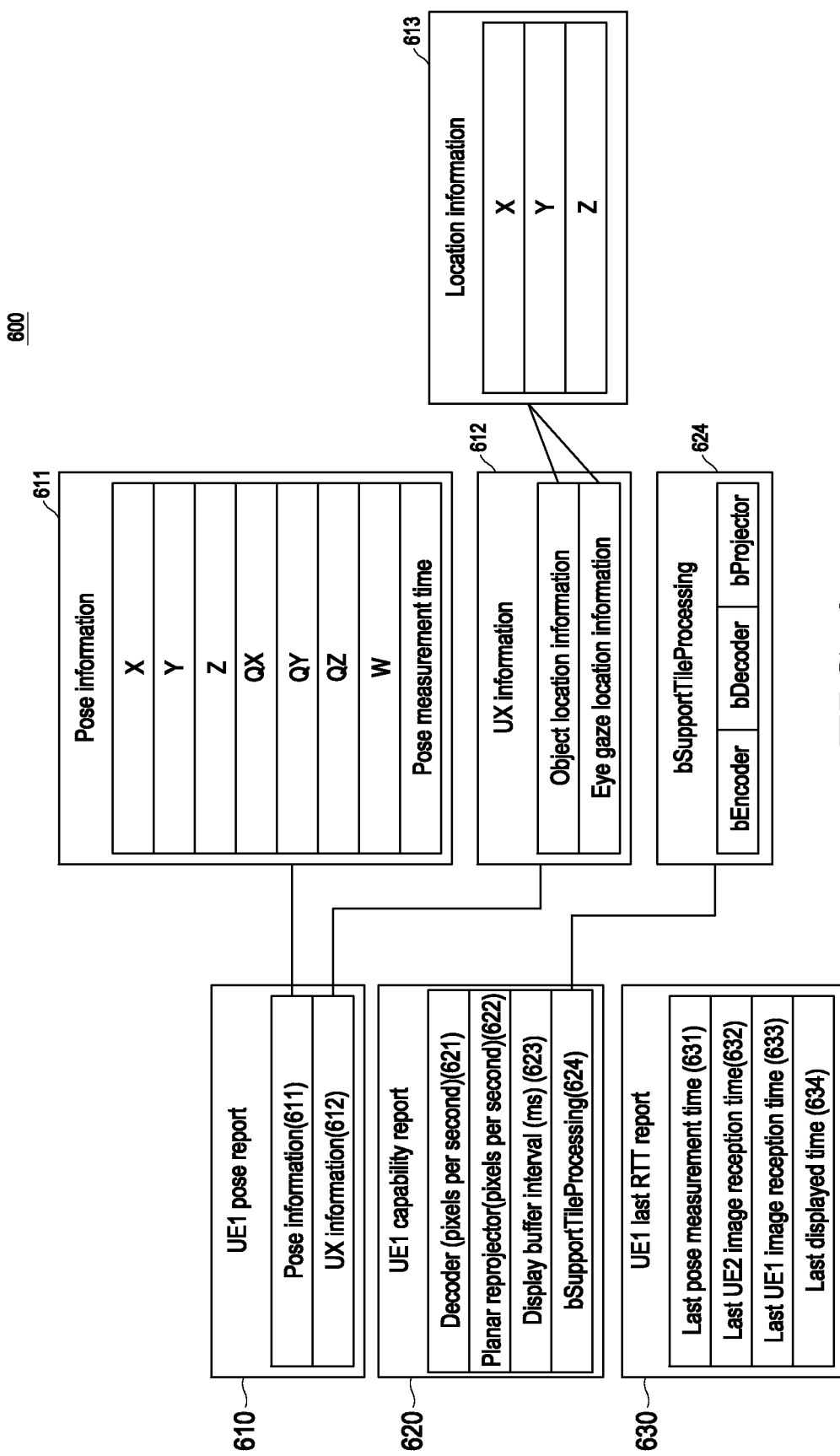
FIG. 6 illustrates a UE1 report according to an embodiment of the disclosure.
Figure 7:
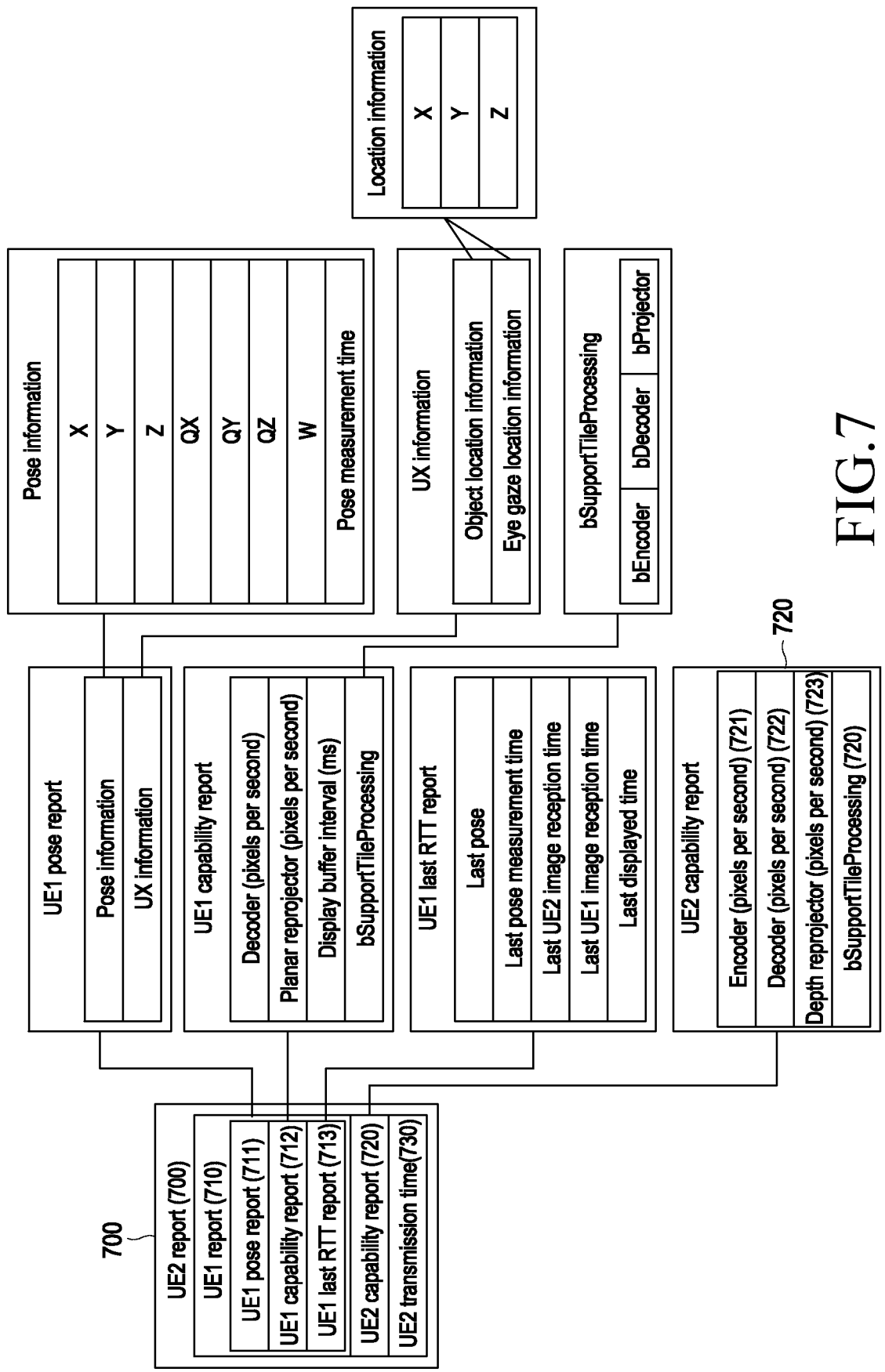
FIG. 7 illustrates a UE2 report according to an embodiment of the disclosure.

If there is no separate report from the UE, only the pose data size among the above time-related components may be directly identified by the server. Accordingly, the remaining time-related components need to be included in the data (report) transmitted from each UE to the server as illustrated in FIGS. 6 and 7.

The prediction engine of the server may determine a target time/target point using the received data and may predict the pose at the target time/target point (5040). The data of the so-predicted pose (first predicted pose) and the target time/target point may be transferred to the renderer of the server. The prediction time (target time/target point) that the server intends to predict through the prediction model may be represented as in Equation 2 below, e.g., if the procedure illustrated in FIG. 5 is performed.

Target time=server rendering time+server encoding
time+(transmission data size1/prediction bandwidth1)+UE1 latency+UE2 latency+UE2 decoding+UE2 depth reprojection+UE2 encoding+
(transmission data size2/prediction
bandwidth2)+UE1 decoding+UE1 planar reprojection+UE1 display interval.   [Equation 2]

Here, UE1 latency means the transmission latency of the first network connecting UE1 and UE2, that is, the first network transmission latency. UE2 latency means the transmission latency of the second network connecting UE2 and the server, that is, the second network transmission latency.

If accurate calculation of the target time/target point is not made, more processing time is required in UE2 and UE1, so that an AR effect may be represented only after the target time/target point. In such a case, even when prediction has been properly done, since the user's motion after the target point has not been predicted, the AR effect cannot be used and need be dropped. This is described below with reference to FIG. 8.

Therefore, in order for the server to figure out the time-related components and calculate (determine) an accurate target time/target point, a report, as illustrated in FIGS. 6 and 7, needs to be provided by each UE. Example reports provided by UEs are described below with reference to FIGS. 6 and 7.

FIG. 6 illustrates a UE1 report according to an embodiment of the disclosure.

FIG. 7 illustrates a UE2 report according to an embodiment of the disclosure.

In the embodiment of FIG. 7, it is assumed that a UE2 report 700 includes a whole UE1 report 600. However, according to an embodiment, the UE2 report 700 may include only part of the UE1 report 600 or may not include the UE1 report 600.

Referring to FIG. 6, the UE1 report 600 includes a UE1 pose report 610, a UE1 capability report 620, and/or a UE1 last RTT report 630.

The pose report 610 includes pose information 611 and UX information 612.

The pose information 611 include a spatial position (X, Y, Z), a gazing direction (QX, QY, QZ, W), and/or the measurement time at which the pose is measured (pose measurement time).

The UX information 612 provides object location information for the object (AR object) placed by the user on the virtual space and the user's eye gaze location information through analysis of the user's gaze. Through the UX information 612, the prediction model may determine which way the user faces although the user moves and where the center axis is when the user rotates and may accordingly modify the prediction model parameters. As an embodiment, the object location information and the eye gaze location information may be location information 613 represented as a spatial location (X, Y, Z).

The UE1 capability report 620 may provide a capability report for at least one element (e.g., processes) of the content processing device (e.g., the third AR content processing device 214 of FIG. 2) included in UE1. For example, the UE1 capability report 620 may include processing capability information (e.g., pixels per second) 621 for UE1's decoder (e.g., the decoder process 214-2 of FIG. 2), processing capability information (e.g., pixels per second) 622 for UE1's reprojector (e.g., the reprojection process 214-1 of the planar reprojector of FIG. 2), processing capability information 623 for the display buffer interval (e.g., in ms), and/or processing capability information 624 for tile processing supporting. Although the decoder and the reprojector are included, as examples, in FIG. 6, it is apparent to one of ordinary skill in the art that a capability report of additional processes used to process AR content in the UE1 may be included in the UE1 capability report.

The UE1 last RTT report 630 reports the operation result obtained from the output of the immediately previous AR effect to the server. The UE1 last RTT report 630 may report information for the actually used pose in the output, the time of measurement of the used pose (last pose measurement time) 631, the time of reception of the image (bitstream) by UE2 from the server (last UE2 image reception time) 632, the time of reception of the image by UE1 from UE2 (last UE1 image reception time) 633, and/or the time of display of the AR effect image (last displayed time) 634. Accordingly, the server may analyze what spatial or temporal prediction error the prediction model had and may modify the model to offset it.

Referring to FIG. 7, the UE2 report 700 may include a UE1 report 710, a UE2 capability report 720, and/or a UE2 transmission time 730. What has been described above in connection with FIG. 6 applies to the UE1 report 710 included in the UE2 report 720. For example, the UE1 pose report 711, the UE1 capability report 712, and the UE1 last RTT report 713 included in the UE1 report 710 may be identical to the UE1 pose report 610, the UE1 capability report 620, and the UE1 last RTT report 630 included in the UE1 report 600 of FIG. 6.

The UE2 capability report 720 may provide a capability report for at least one element (e.g., processes) of the content processing device (e.g., the second AR content processing device 221 of FIG. 2) included in UE2. For example, the UE2 capability report 720 may include processing capability information (e.g., pixels per second) 721 for UE2's encoder (e.g., the encoder process 221-1 of FIG. 2), processing capability information (e.g., pixels per second) 722 for UE2's decoder (e.g., the decoder process 221-4 of FIG. 2), processing capability information (e.g., pixels per second) 723 for UE2's reprojector (e.g., the reprojection process 221-3 of the depth reprojector of FIG. 2), and/or processing capability information 724 for tile processing supporting. Although the encoder, decoder, and the depth-reprojector are included, as examples, in FIG. 7, it is apparent to one of ordinary skill in the art that a capability report of additional processes used to process AR content in the UE2 may be included in the UE2 capability report.

Referring back to FIG. 5, the renderer of the server may perform rendering based on the target time/target point and the predicted pose (the first predicted pose) to generate a predicted image (the first predicted image) (5050). In this case, additional data (e.g., depth information (first predicted depth)) for correcting the prediction result in UE2 and/or UE1 may be generated together. The so-generated predicted image and additional data, together with the data of the predicted pose and the target time/target point, may be transferred to the encoder of the server.

The server's encoder may encode the transferred data (5060). The encoded data may be transmitted to UE2. Thus, data of the first predicted pose, the first predicted image, the first predicted depth, and the target time/target point may be transferred to UE2.

The received data may be stored in the buffer of UE2 and be transferred to the decoder of UE2 (5070). The decoder of UE2 may perform decoding on the received data (5080).

UE2 may perform correction on the predicted image using additional data included in the received data (5100). For example, UE2 may correct the first predicted image and generate a second predicted image by performing depth reprojection using the depth information. In this case, the user's pose information (first updated pose information) 5090 received from UE1 at the time of data reception or decoding may be used for correction of the first predicted pose, and the first predicted image may be corrected based on the corrected predicted pose (second predicted pose). The data of the so-generated second predicted image, second predicted pose, and target time/target point may be encoded and transferred to UE1 (5110).

The received data may be stored in the buffer of UE1 and be transferred to the decoder of UE1 (5120). The decoder of UE1 may perform decoding on the received data (5130). UE1 may obtain the user's pose information (second updated pose information) measured at the time of data reception or decoding (5140). UE1 may perform correction on the second predicted image based on the obtained pose information (5150). For example, UE1 may generate a final image by performing correction on the second predicted image using planar reprojection. The so-generated final image may be stored in a buffer for display and may be displayed at the target time/target point (5160).

Meanwhile, the server may operate a prediction model using information contained in the UE1 report and the UE2 report described above with reference to FIGS. 6 and 7. The prediction model may be gradually enhanced using the history of the measured pose, performed prediction, and the error information between the prediction and the actual pose.

Figure 8:
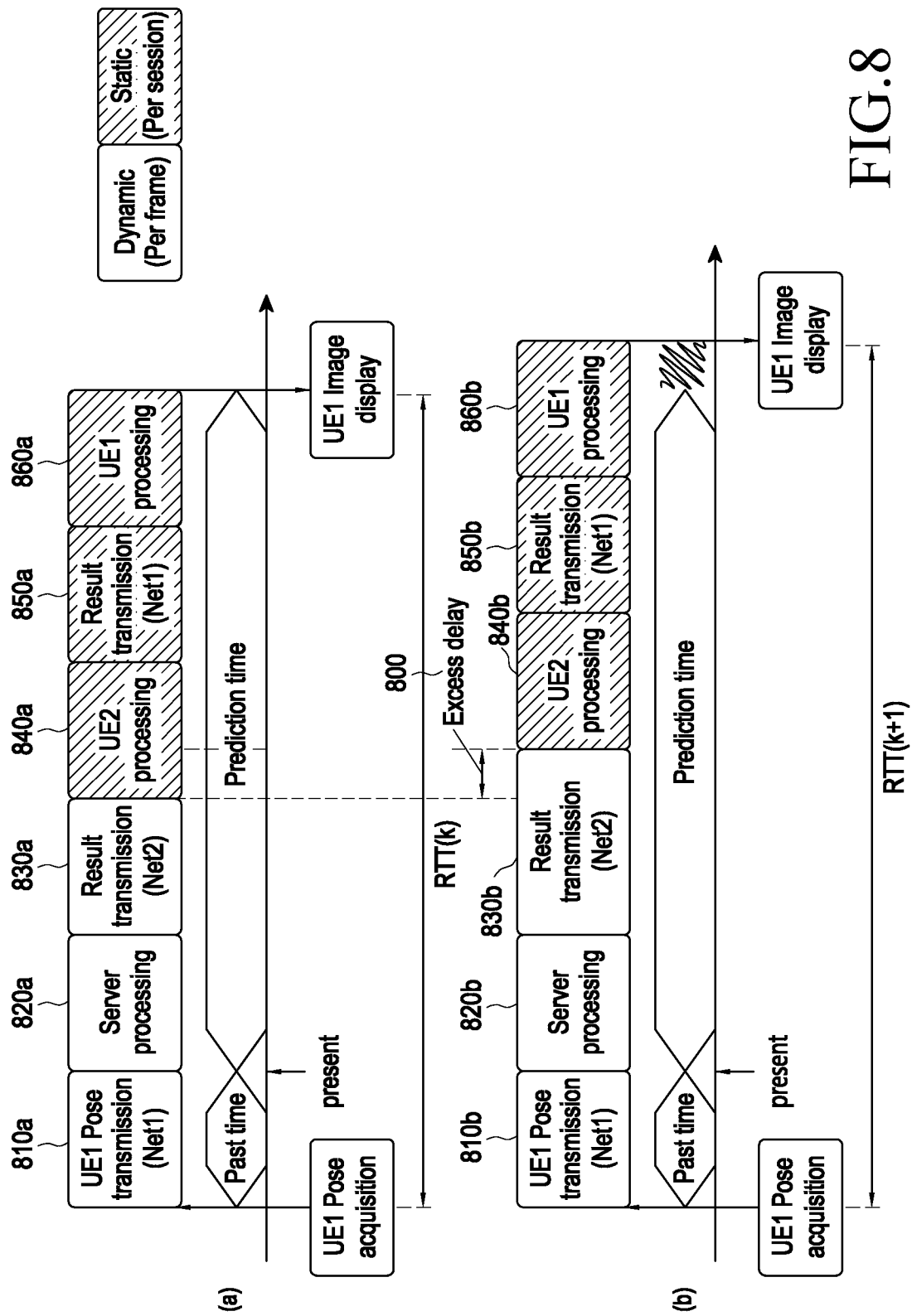
FIG. 8 illustrates an example of a prediction model according to an embodiment of the disclosure.

FIG. 8 illustrates an example of a prediction model according to an embodiment of the disclosure.

In the prediction model of FIG. 8, the shaded time periods indicate static time periods which mean periods during which a predetermined time as predicted is required. Non-shaded time periods indicate dynamic time periods which mean periods in which a different time is required each time due to unpredictable external factors. As an embodiment, the static time period may be variable per session (per session), and the dynamic time period may be variable per frame.

(a) of FIG. 8 illustrates an entire time period (a first full time period) for a kth image processing operation. (b) of FIG. 8 illustrates an entire time period (a second full time period) for a k+1th image processing operation. As described above, in the time period for the k+1th image processing operation, UE1 may transmit an RTT report (e.g., the UE1 last RTT report 630 of FIG. 6) for the previous kth image processing operation.

Referring to (a) of FIG. 8, the first full time period may include a UE1 pose transmission time period 810a, a server processing time period 820a, a first result transmission time period 830a, a UE2 processing time period 840a, a second result transmission time period 850a, and a UE1 processing time period 860a.

Referring to (b) of FIG. 8, the second full time period may include a UE1 pose transmission time period 810b, a server processing time period 820b, a first result transmission time period 830b, a UE2 processing time period 840b, a second result transmission time period 850b, and a UE1 processing time period 860b. The description of each time period of (a) of FIG. 8 may apply to each time period of (b) of FIG. 8.

The UE1 pose transmission time period 810a/b may be a time period from when UE obtains pose information to when the obtained pose information is received by the server through the first network Net1. For example, the UE1 pose transmission time period 810a/b may be a time period for operations 301 to 303 of FIG. 3.

The server processing time period 820a/b may be a time period from when the server performs image processing based on the pose information to when the server generates resultant data (first resultant data). For example, the server processing time period 820a/b may be a time period for operations 304 to 308 of FIG. 3.

The first resultant transmission time period 830a/b may be a time period from transmission of the generated first resultant data through the second network Net2 to reception of the first resultant data by UE2. For example, the first result transmission time period 830a/b may be a time period for operation 309 of FIG. 3.

The UE2 processing time period 840a/b may be a time period from when UE2 performs image processing based on the first resultant data to when UE2 generates resultant data (second resultant data). For example, the UE2 processing time period 840*a/b* may be a time period for operations 310 to 313 of FIG. 3.

The second resultant transmission time period 850*a/b* may be a time period from transmission of the generated second resultant data through the first network Net1 to reception of the second resultant data by UE1. For example, the second result transmission time period 850*a/b* may be a time period for operation 314 of FIG. 3.

The UE1 processing time period 860*a/b* may be a time period from when UE11 performs image processing based on the second resultant data to when UE1 displays an AR effect (image). For example, the UE1 processing time period 860*a/b* may be a time period for operations 315 to 318 of FIG. 3.

As an embodiment, the server processing time period 820*a/b*, the UE2 processing time period 840*a/b*, and the UE1 processing time period 860*a/b* may belong to the static time periods. The UE1 pose transmission time period 810*a/b*, the first result transmission time period 830*a/b*, and the second result transmission time period 850*a/b* may belong to the dynamic time periods.

Meanwhile, as compared with (a) of FIG. 8, if an excess delay 800 occurs in the dynamic time period associated with the second network as illustrated in (b) of FIG. 8, UE1 may display the AR effect (predicted image) after the target time/target point elapses. In this case, since the user's motion after the target time/target point has not been predicted, the AR effect predicted by the server cannot be used. Therefore, it is necessary to accurately predict the dynamic time period and determine the target time/target point.

Figure 9:
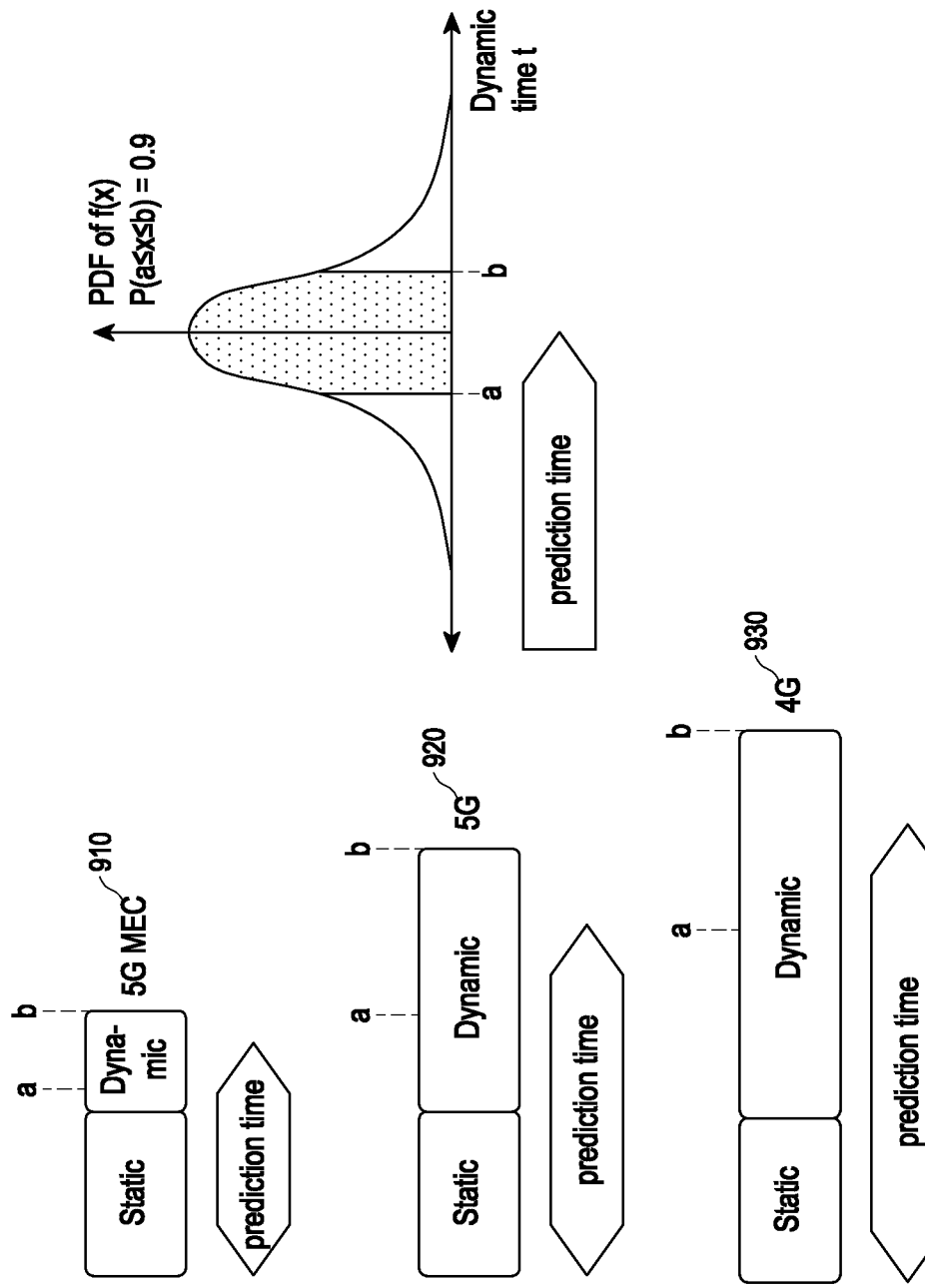
FIG. 9 illustrates another example of a prediction model according to an embodiment of the disclosure.

FIG. 9 illustrates another example of a prediction model according to an embodiment of the disclosure. Referring to FIG. 9, the prediction model may predict the dynamic time period, determine controllable elements, e.g., the transmission amount or processing type, included in the static time period, and again grasp the size of the dynamic time period predictable to be required according to the history and distribution of the results of the dynamic time period.

If the dynamic time period does not reach the capability of the currently selected data transmission network or in the opposite case, it is provided to select a selectable heterogeneous data network. In other words, e.g., if it is determined that the time required for the dynamic time period is large in a UE2-server network connection which may select both an LTE (4G) transmission network (910) and a 5G transmission network (920, 930), the transmission path switches from the LTE (910) to 5G network (920). Also provided is use of a 5G MEC (930) among 5G networks if processing needs to be performed in a shorter time. In this case, since server processing shifts from the cloud to the MEC (930), a method for associating the service session with which the service provider proceeds on the cloud to the MEC (930) is provided, and the client application of the service provider operating on the terminal is notified of this so as to grasp connection information for the varied server application.

If the static time period needs to be enhanced, the first, second, and third AR content processing devices (e.g., the first AR content processing device 214, the second AR content processing device 221, and the third AR content processing device of FIG. 2) and their processes may be configured to perform at least one of the following steps (operations) of:

determining the complexity of 3D content, i.e., analyzing the characteristics and number of 3D graphic elements of the 3D content and determining the system specifications required by the 3D content, and determining the following processing order accordingly and obtaining and transmitting the data used by each process;

if the result of the analysis may be used regardless of the capability or type of the server, it is preferable to previously indicate the complexity of the 3D content with one or more capability indexes and provide it. Otherwise, such inefficiency occurs where capability analysis may be performed even on the same content every reproduction. It is preferable to use the types of graphic elements of the 3D content and the number of the graphic elements per second as indicators according to the above-described purposes. For example, the number of points in the point cloud content or the number of texels in the mesh content may be used as an indicator to determine whether the renderer may reproduce the corresponding content in real time;

the step (operation) of converting 3D content into 2D content, that is, the configuration (operation) of processing content requiring high processing capability, such as computation the effect of light as does the renderer, by a high-capability server, creating a 2D image as the result, and correcting the 2D image in the second or third AR content processing device;

the step (operation) of converting 3D content into 3D content, that is, the configuration (operation) of reducing the number of 3D graphic elements only in a range representable on the AR display if the number of 3D graphic elements is large and transferring the result to the second or third AR content processing device;

the composite step (operation) of 3D and 2D processing, that is, the configuration (operation) of reducing the number of 3D graphic elements and transferring them, rendering them on the second AR content processing device, and transferring them to the third AR content processing device; or another embodiment of the composite step, that is, the configuration (operation) of rendering the 3D graphic by the renderer, separately providing 3D information, and reperforming 3D rendering on part thereof according to the user's 3D repositioning in the second or third AR content processing device.

The above-described dynamic and static time period configurations and processing configurations are determined based on the complexity of AR content, the capability of the AR content processing device, and the transmission capability of the data network.

Figure 10:
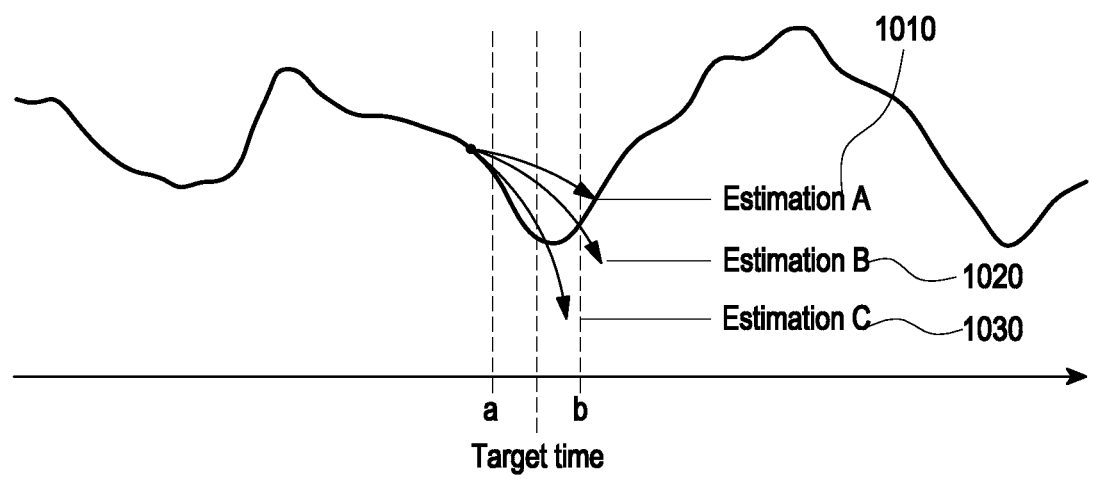
FIG. 10 illustrates a method for using a plurality of prediction models according to an embodiment of the disclosure.

FIG. 10 illustrates a method for using a plurality of prediction models according to an embodiment of the disclosure.

In the embodiment of FIG. 10, it is assumed that a plurality of prediction models (e.g., three) are used for prediction. If the solid line indicates the user's motion, one of a plurality of types of data (e.g., seven-dimensional (7D) data (X, Y, Z, QX, QY, QZ, W), location XYZ, direction QXYZW) for the gazing direction, the prediction model may generate one or more prediction values (e.g., estimation A (1010), estimation B (1020), and estimation C (1030)) according to parameters. Although the plurality of prediction models predict that the user moves in direction A, B, or C as illustrated in FIG. 10, the user moves in a direction which belongs to none of them in practice, by the limitations of the current prediction technology. However, since the error between the actual location and the data when predicted as C, rather than as A, is smallest, spatial distortion is reduced when data of C is corrected, as compared with when data of A is corrected.

Thus, it is preferable to operate several prediction models within a range permitted by the transmission network capacity and processing capability. In the disclosure, it is provided that a plurality of prediction values and AR effect image data according thereto include information, such as prediction values, data, and probability. If it is intended to send a plurality of data within a conventional data size, that is, when the plurality if data is transmitted as a 2D image, when only ½ of the width and length is assigned and four pieces are sent to transmit four prediction models, a configuration may be made as in the embodiment of FIG. 11 described below.

Figure 11:
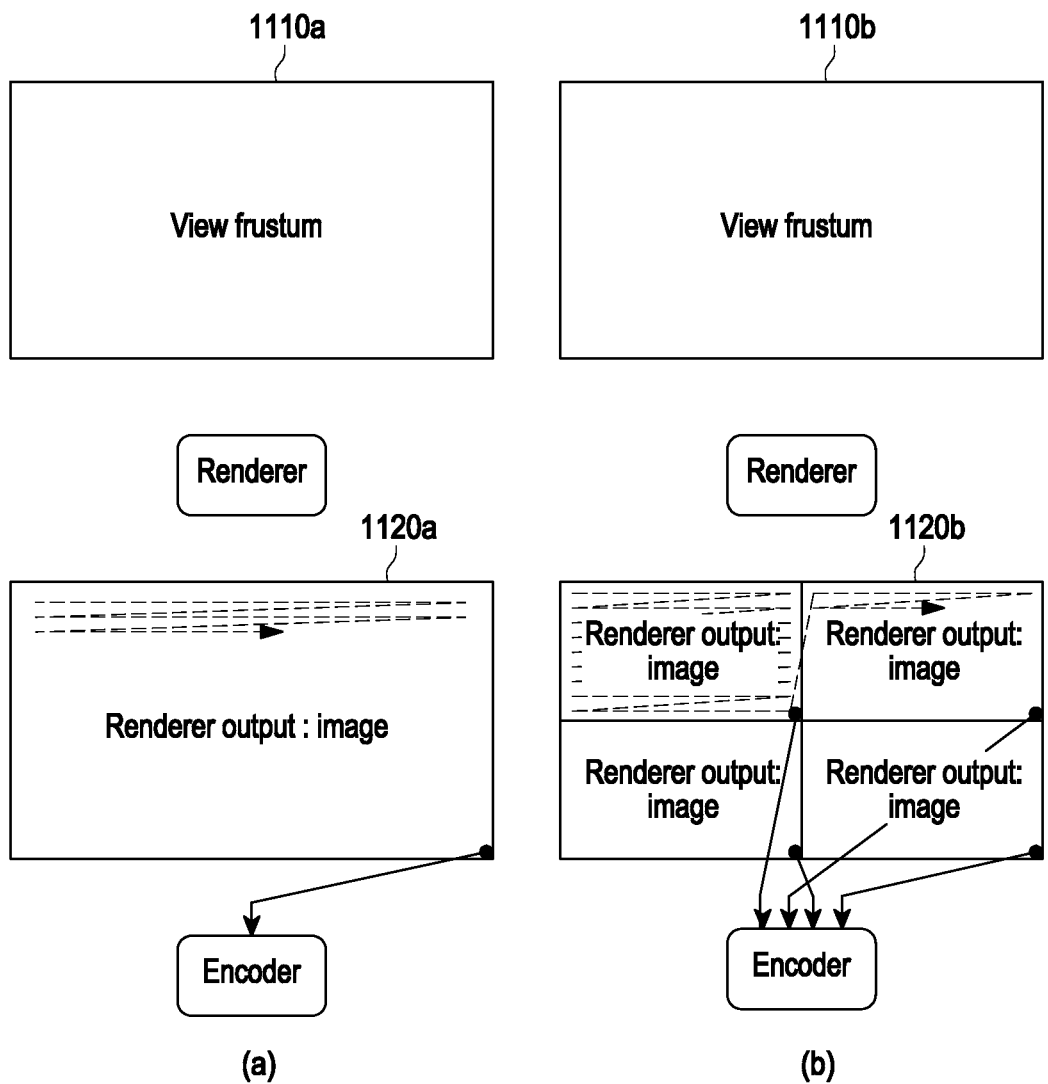
FIG. 11 illustrates a method for transmitting a plurality of prediction values according to an embodiment of the disclosure.

FIG. 11 illustrates a method for transmitting a plurality of prediction values according to an embodiment of the disclosure.

(a) of FIG. 11 shows an embodiment in which one image (renderer output) is packed in one image frame 1120a, and (b) of FIG. 11 shows an embodiment in which a plurality of images (renderer output) is packed in one image frame 1120b.

In FIG. 11, view frustum (1110a, 1110b) is the user's gazing direction and an area rendered by the renderer. For example, an entire virtual reality (VR) image has 360 degrees, but the area to be rendered by the renderer is limited to the portion shown on the screen the VR HMD. When the encoder transmits four prediction results, four images are resized and packed into one image frame (1110b) as illustrated at the bottom side of (b) of FIG. 11. In this case, if the encoder performs encoding from the top left to top right, with all of the four images provided, all of the four need to be prepared before encoding. However, if encoding is performed using a tile which is supported after HEVC, encoding may be independently performed since any one of the four images is prepared.

Figure 12:
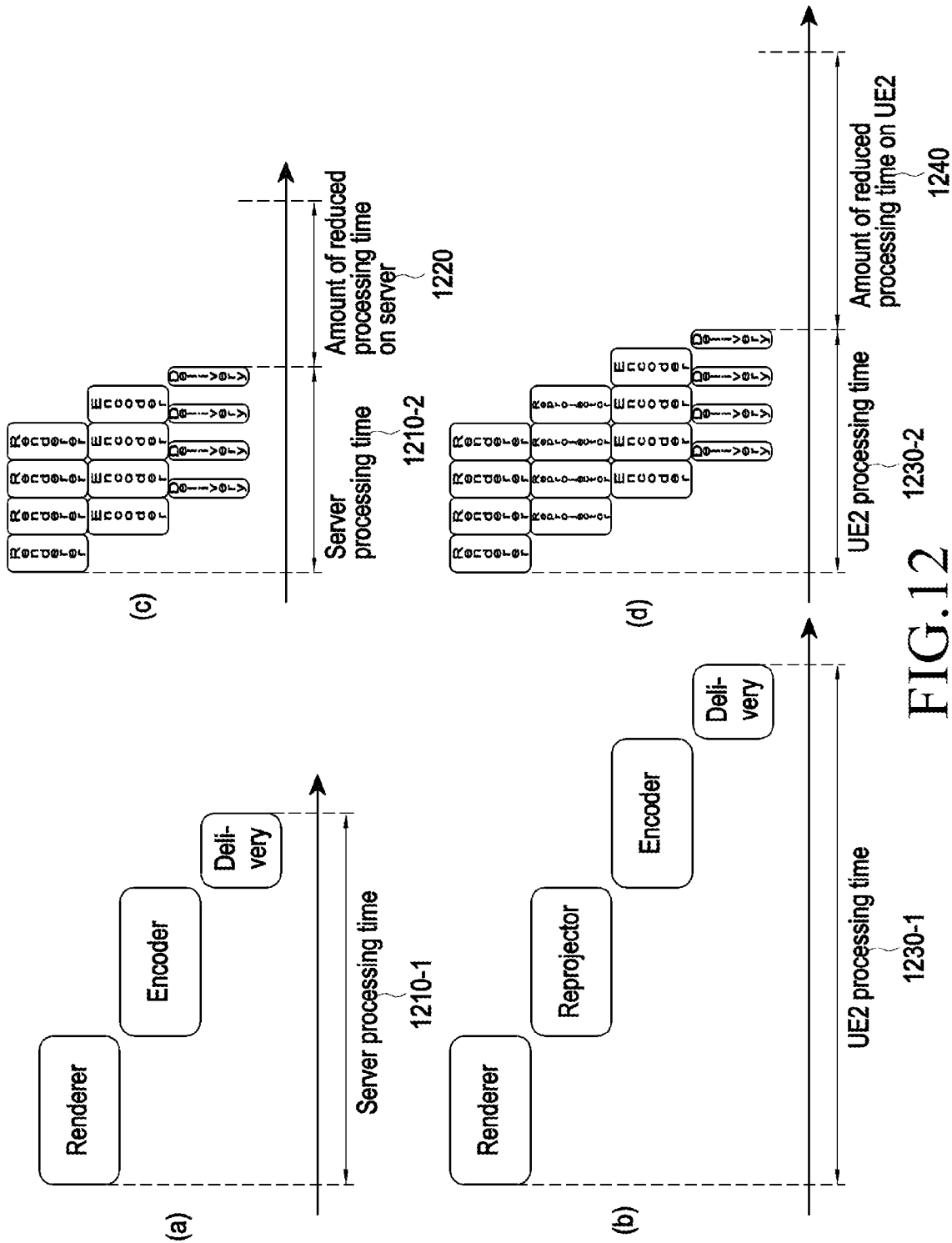
FIG. 12 illustrates an image processing procedure using a tile according to an embodiment of the disclosure.

FIG. 12 illustrates an image processing procedure using a tile according to an embodiment of the disclosure.

(a) and (b) of FIG. 12 illustrate image processing procedures of the server (e.g., the server 230 of FIG. 2) and UE2 (e.g., the UE1 210 of FIG. 2 or the UE2 220 of FIG. 2) when no tile is used, and (c) and (d) of FIG. 12 illustrate image processing procedures of the server and UE2 when a tile is used.

(a) and (c) of FIG. 12 illustrate a case where the server performs rendering, encoding, and transmission in a configuration where no tile is used and a temporal gain (1220) that may be achieved when a tile is used. (b) and (d) of FIG. 12 illustrate temporal gains (1240) that may be achieved in a configuration where the UE does not use a tile and a configuration where the UE uses a tile. The tiles are processed in the order in which the tiles are prepared, so that the time is reduced as compared with when all areas are processed. If the renderer, decoder, and encoder all support parallel processing, it is obvious that the time is further reduced. For example, the server processing time (1210-2) of the embodiment of (c) of FIG. 12 using the tile is shorter than the server processing time (1210-1) of the embodiment of (a) of FIG. 12 not using the tile. Thus, the embodiment of (c) of FIG. 12 has a temporal gains/amount of reduced processing time (1220) on the server, compared to the embodiment of (a) of FIG. 12. For another example, the UE2 processing time (1230-2) of the embodiment of (d) of FIG. 12 using the tile is shorter than the UE2 processing time (1230-1) of the embodiment of (b) of FIG. 12 not using the tile. Thus, the embodiment of (d) of FIG. 12 has a temporal gains/amount of reduced processing time (1240) on UE2, compared to the embodiment of (b) of FIG. 12.

While in the embodiment of FIG. 12, tiles are used, and one tile is associated with one prediction model, the embodiment of FIG. 13 described below proposes a method in which a screen (image) is split into a plurality of tiles, the plurality of tiles constitute one or more tile groups, and the tile group is associated with the prediction model. In the disclosure, each tile split from one screen (image) may be denoted as a sub tile.

Figure 13:
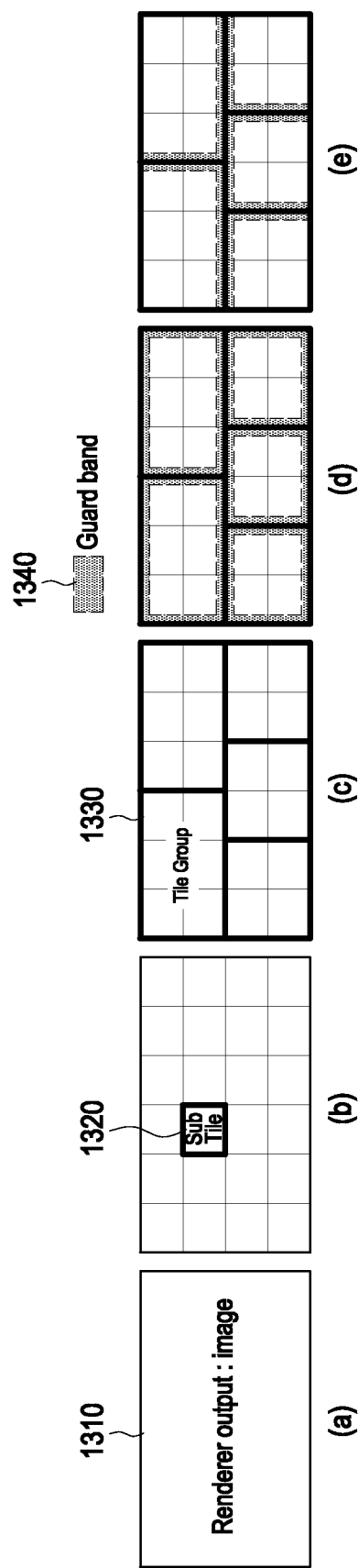
FIG. 13 illustrates an image processing procedure using a tile group according to an embodiment of the disclosure.

FIG. 13 illustrates an image processing procedure using a tile group according to an embodiment of the disclosure.

Referring to FIG. 13, tiles have a configuration of m×n, and among them, any number of tiles may be bundled into one tile group, and each tile group may have a guard band not to cause mutual disturbance in the adjacent area.

The guard band may be applied only to adjacent edges between tile groups but not to non-adjacent edges, considering the characteristics of the encoder.

The edge is resizable.

For example, as illustrated in (a) of FIG. 13, there may be one image frame (1310) as an output of the renderer and, as illustrated in (b) of FIG. 13, one image frame may be split into m×n (e.g., 6×4) sub tiles (1320) and, as illustrated in (c) to (e) of FIG. 13, a plurality of sub tiles may form a tile group (sub tile group) (1330). Further, as illustrated in (d) and (e) of FIG. 13, each tile group may have a guard band (1340) and, as illustrated in (e) of FIG. 13, the guard band (1340) of each tile group is applied only to adjacent edges between tile groups but not to non-adjacent edges.

As described above, FIG. 14 may illustrate a method for representing a configuration of data in a server that transmits data of a plurality of prediction model using tiles, tile groups, and guard bands as described above.

Figure 14:
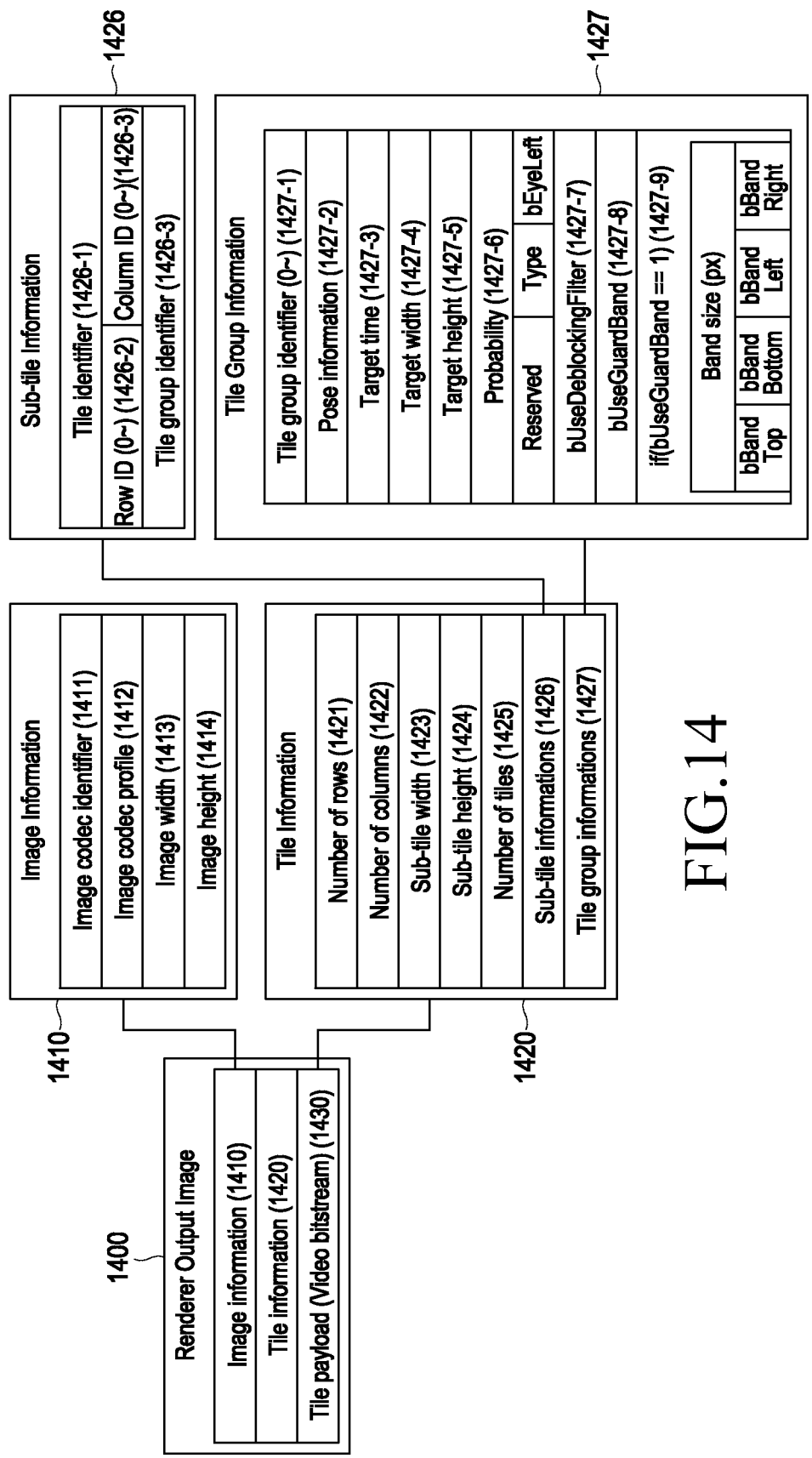
FIG. 14 illustrates a data structure that provides data for a rendered output image according to an embodiment of the disclosure.

FIG. 14 illustrates a data structure that provides data for a rendered output image according to an embodiment of the disclosure.

Referring to FIG. 14, the renderer output image (RenderOutputImage) 1400 may include information about the image (image information) 1410, information about the tile (tile information) 1420, and/or the payload of the tile (e.g., video stream) 1430.

The image information 1410 includes at least one of the video stream codec information (e.g., image codec identifier 1411 and codec profile 1412) and information about the overall size of the image (e.g., image width 1413 and image height 1414).

The tile information 1420 includes at least one of the number of rows/number of columns 1421 and 1422, the size of the tile (expressed as a sub-tile) (sub-tile width/sub-tile height) 1423 and 1424, the number of tiles 1425, information about each tile (sub-tile information) 1426, and tile group information 1427.

In the disclosure, the tiles have their own identifiers, in ascending order from 0 for row and column positions and belong to one tile group. Accordingly, the information about each tile (sub-tile information) 1426 includes at least one of the identifier of the tile (tile identifier) 1426-1, the identifiers of the rows and columns of the tile (row ID(0 to) and column ID(0 to)) 1426-2 and 1426-3, and the identifier (tile group identifier) 1426-4 of the tile group to which the tile belongs.

Further, in the present disclosure, each tile group has an identifier and is associated with the pose, target time/target point, target size, prediction probability, which one of the left and right eyes in the stereoscopic the image is for, whether to use the deblocking filter of the video decoder, whether to use the guard band and, if used, the size, and which side of the top, bottom, left, and right the guard band is located. Thus, the information for each tile group (tile group information) 1427 may include at least one of the identifier (tile group identifier (0 to)) 1427-1 of the tile group, pose information 1427-2, target time (point of time) information 1427-3, target size information (target width/target height) 1427-4 and 1427-5, prediction probability information 1427-6, information indicating whether the image is for the left eye in the stereoscopic (bEyeLeft) 1427-7, information indicating whether to use the deblocking filter of the video decoder (bUseDeblockingFilter) 1427-8, information indicating whether to use the guard band (bUseGuardband) 1427-9 and, if used, information about the size (band size (px)), and information indicating which side of the top, bottom, left, and right the guard band is located (bBandTop/Bottom/Left/Right) 1427-10.

As in the example of FIG. 14, since some tile groups have a configuration of 3×2 and others have a configuration of 2×2, the above-described target size (target size information) of the tile group indicates what aspect ratio and size the 3×2 or 3×2 image needs to be resized in.

Figure 15A:
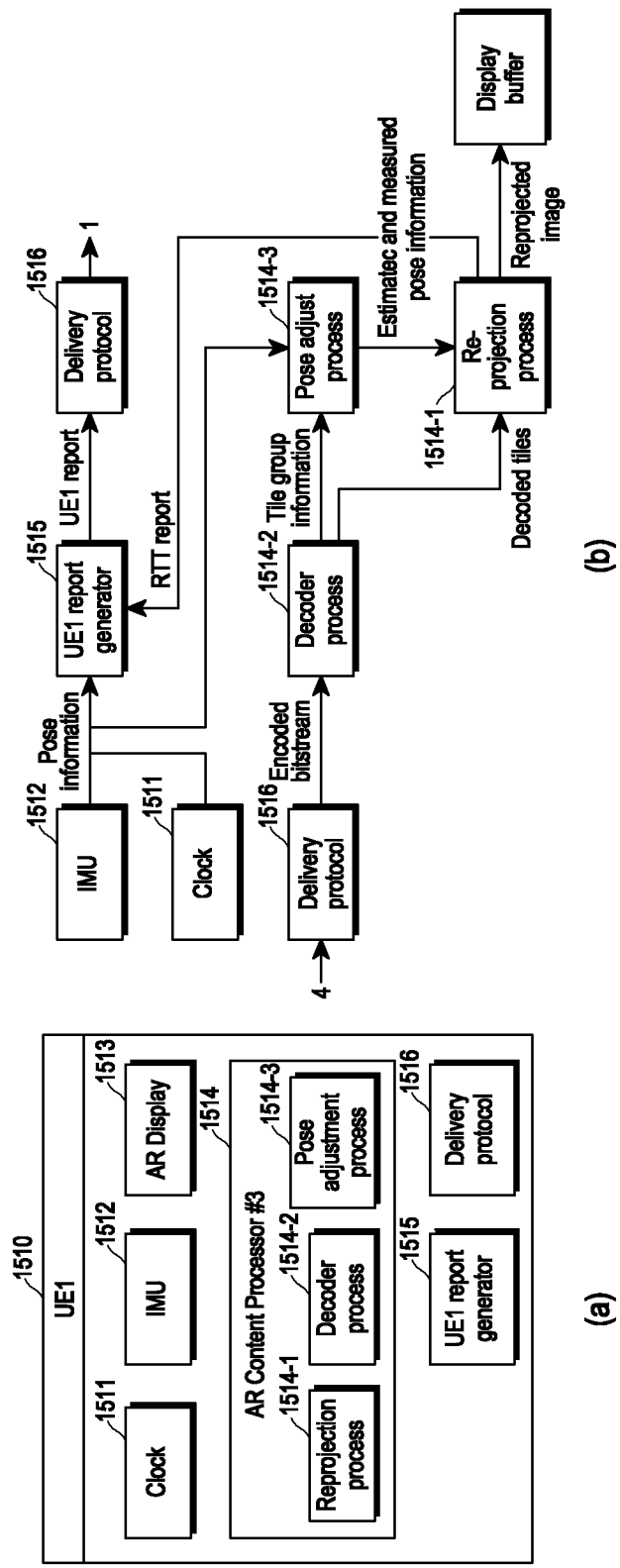
FIGS. 15A, 15B, and 15C exemplarily illustrate a configuration of a content processing system and a content processing procedure of the content processing system according to an embodiment of the disclosure.
Figure 15B:
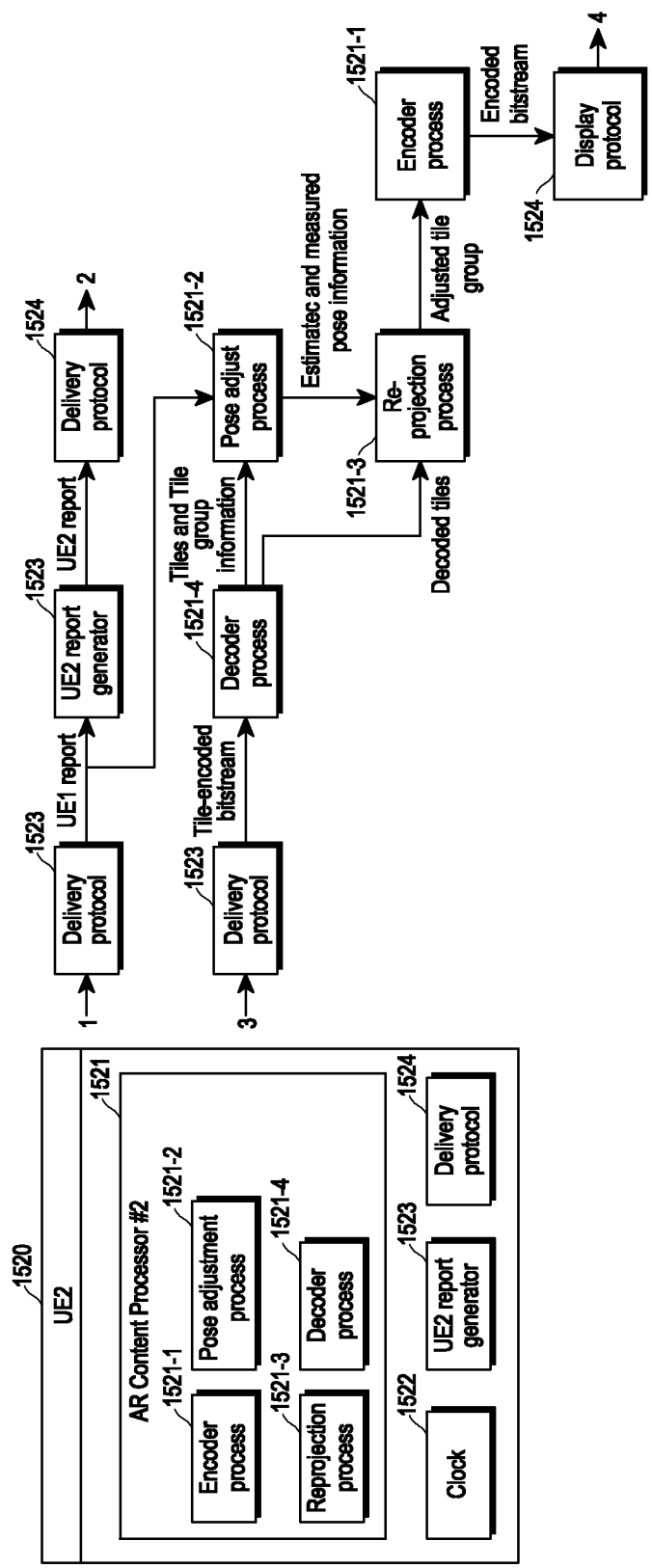
Figure 15C:
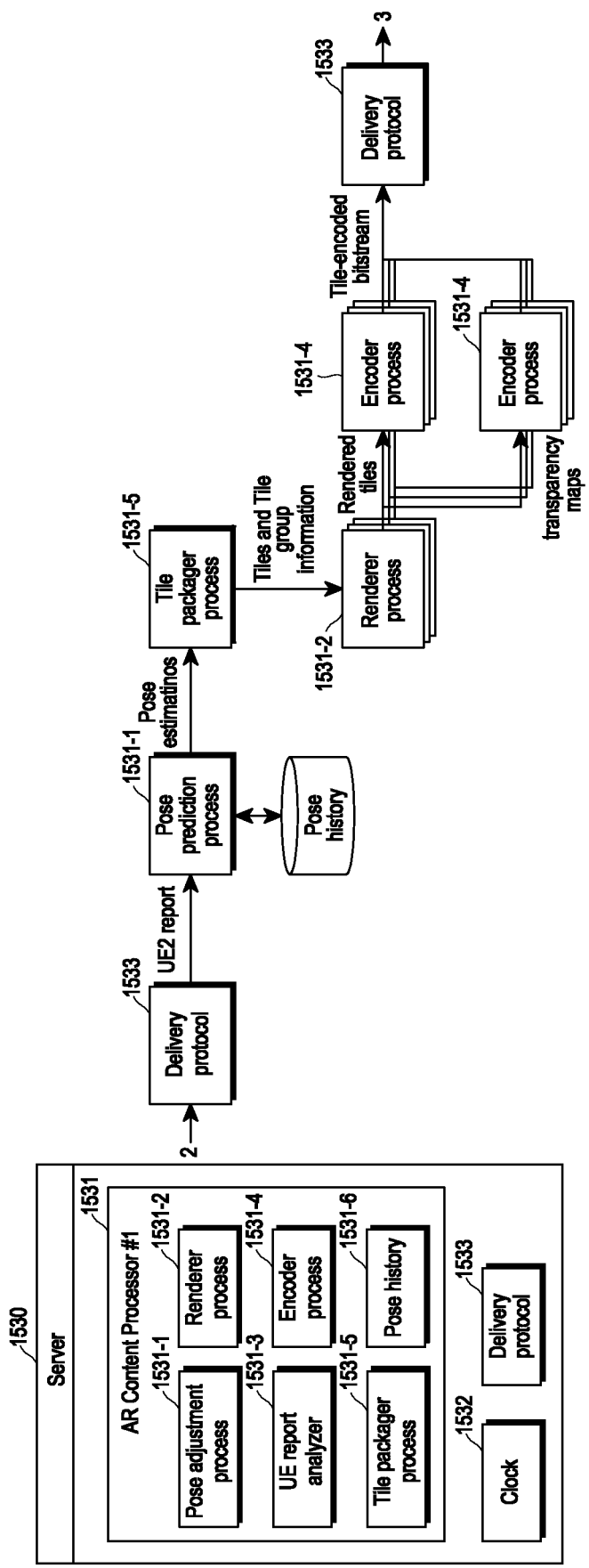

FIGS. 15A, 15B, and 15C exemplarily illustrate a configuration of a content processing system and a content processing procedure of the content processing system according to an embodiment of the disclosure.

Specifically, FIG. 15A illustrates a configuration and content processing procedure of UE1 1510 of a content processing system, FIG. 15B illustrates a configuration and content processing procedure of UE2 1520 of the content processing system, and FIG. 15C illustrates a configuration and content processing procedure of a server 1530 of the content processing system.

Referring to (a) of FIG. 15A, UE1 1510 may include a clock 1511, at least one motion sensor (e.g., IMU) 1512, an AR display 1513, and a third AR content processing device (AR content processor #3) 1514, a first report generator (UE1 report generator) 1515, or a delivery protocol 1516. As an embodiment, the third AR content processing device 1514 may include one or more processes (e.g., a reprojection process 1514-1, a decoder process 1514-2, and/or a pose adjustment process 1514-3). Each component of UE1 1510 may correspond to a respective one of the components of UE1 210 of FIG. 2.

Referring to (a) of FIG. 15B, the UE2 1520 may include at least one of a second AR content processing device (AR content processor #2) 1521, a clock 1522, a second report generator (UE2 report generator) 1523, or a delivery protocol 1524. As an embodiment, the second AR content processing device 1521 may include one or more processes (e.g., an encoder process 1521-1, a pose adjustment process 1521-2, a reprojection process 1521-3, and/or a decoder process 1521-4). Each component of UE2 1520 may correspond to a respective one of the components of UE2 220 of FIG. 2.

Referring to (a) of FIG. 15C, the server 1530 may include at least one of a first AR content processing device (AR content processor #1) 1531, a clock 1532, or a delivery protocol 1533. As an embodiment, the first AR content processing device 1531 may include one or more processes (e.g., a pose prediction process 1531-1, a renderer process 1531-2, a UE report analyzer 1531-3, an encoder process 1531-4, a tile package process 1531-5, and/or a pose history process 1531-6). Each component of the server 1530 may correspond to a respective one of the components of the server 230 of FIG. 2.

Referring to (b) of FIG. 15A, UE1 1510 may measure a pose and obtain a measurement time using the IMU 1512 and the internal clock 1511 and transfer information about the measured pose and measurement time (pose information) to the UE1 report generator 1515. UE1 1510 generates a UE1 report based on the pose information using the UE1 report generator 1515 and transmits the generated UE1 report through a first network to UE2 1520 using the delivery protocol 1516. As an embodiment, the UE1 report may be, e.g., the UE1 report of FIG. 6.

Referring to (b) of FIG. 15B, UE2 1520 receives the UE1 report through the first network using the delivery protocol 1524 and transfers the received UE1 report to the UE2 report generator 1523. The UE2 1520 may generate a UE2 report including the UE1 report and UE2 information using the UE2 report generator 1523 and transmits the generated UE2 report through a second network to the server 1530 using the delivery protocol 1524. As an embodiment, the UE2 report may be, e.g., the UE2 report of FIG. 7.

Referring to (b) of FIG. 15C, the server 1530 receives the UE2 report through the second network using the delivery protocol 1533 and transfers the received UE2 report to the pose prediction process 1534. The transferred UE2 report may be kept as a record by the pose history 1531-6 and may be used to predict the pose by the pose prediction process 1534. The predicted pose is transferred to the first AR content processing device 1531 including the tile packager process 1531-5. The tile packager process 1531-5 is responsible for controlling the operation of a plurality of renderers (renderer processes) 1531-2 and a plurality of types of a plurality of encoders (encoder processes) 1531-4. The encoder 1531-4 may include a plurality of types of encoders, such as of an red-green-blue (RGB) image, a transparency image, an occupancy image, and a depth image, and are selected depending on the process type in UE2 and UE1. The tile packager process 1531-5 is controls even when there is only one tile, that is when no tile (sub-tile) is used. Operations of the tile packager process 1531-5, the renderer 1531-2, and the encoder 1531-4 using the tile are the same as those described above with reference to FIGS. 11 to 14. The output result of the encoder is stored as a bitstream and transmitted through the second network to UE2 1520 using the delivery protocol 1533.

Referring to (b) of FIG. 15B, UE2 1520 receives the bitstream through the second network using the delivery protocol 1524 and transfers the received bitstream to the decoder 1521-4. The bitstream may be corrected by the second AR content processing device 1521 based on the pose information received from UE1 1510, e.g., at the time of receiving the bitstream. Specifically, UE2 1520 may correct the predicted pose based on the received pose received from UE1 at the time of reception of the bitstream and the predicted pose (first predicted pose) predicted by the server using the pose adjust process 1521-2 and transfer information about the corrected predicted pose (second predicted pose) to the reprojection process 1521-3. UE2 1520 may correct the predicted image (first predicted image) predicted by the server 1530 based on the corrected predicted pose information using the reprojection process 1521-3 to thereby generate a corrected predicted image (second predicted image). The so-corrected result may be re-encoded and transferred to UE1 1510 through the first network.

Referring to (b) of FIG. 15A, UE1 1510 receives the corrected result, as a bitstream, through the first network using the delivery protocol 1516 and transfers the received bitstream to the decoder 1514-2. The bitstream may be corrected by the third AR content processing device 1514 based on the pose information measured, e.g., at the time of reception of the bitstream. Specifically, UE1 1510 may correct the predicted pose based on the measured pose and the predicted pose (second predicted pose) corrected by UE1 1510 using the pose adjust process 1514-3 and transfer information about the corrected predicted pose (third predicted pose) to the reprojection process 1514-1. UE1 1510 may correct the second predicted image based on the corrected predicted pose using the reprojection process 1514-1 and generate a corrected predicted image (third predicted image). The so-corrected result is stored in the display buffer and periodically displayed on the AR display. Further, UE1 1510 may transfer information for the RTT report to the UE1 report generator 1515 using the reprojection process 1514-1.

The above description of embodiments of the disclosure focuses primarily on a system configuration including an AR display, a first electronic device (e.g., UE1) processing acquisition/transmission of pose information, a second electronic device (e.g., the server) processing prediction of the image and pose of the target time/target point based on pose information received from the first electronic device, and a third electronic device (e.g., UE2) positioned between the first electronic device and the second electronic device and performing first correction on the predicted image.

However, it is apparent to one of ordinary skill in the art that embodiments of the disclosure may be applied not only to systems having such configuration but also to systems having a modified configuration.

For example, embodiments of the disclosure may also be applied to systems including only the first electronic device and second electronic device. In this case, it is obvious that the operations performed by the third electronic device are omitted from among the foregoing description. For example, the operation of generating a report (e.g., UE2 report) performed by the third electronic device (e.g., UE2) is omitted. In other words, the report (e.g., UE1 report) generated by the first electronic device (e.g., UE1) may be directly transmitted to the second electronic device (e.g., server), and the second electronic device may perform operations based thereupon. Further, the first correction operation performed by the third electronic device is omitted. In other words, the data of the image predicted by the second electronic device may be directly transferred to the first electronic device and corrected by the first electronic device. The above-described embodiments may be partially modified in such a manner and applied to systems having a different system configuration.

Figure 16:
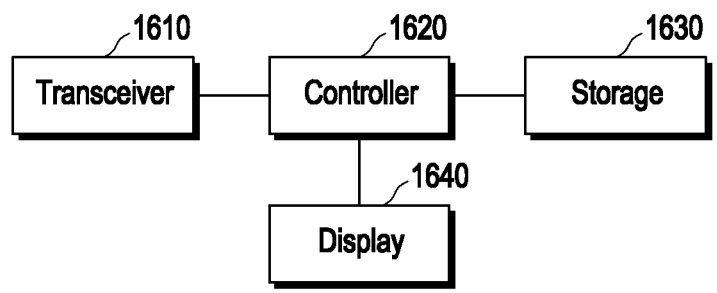
FIG. 16 is a view illustrating a structure of a UE according to an embodiment of the disclosure.

FIG. 16 is a view illustrating a structure of a UE according to an embodiment of the disclosure. UEs having the structure of FIG. 16 may be, e.g., UE1 and UE2 of FIG. 2.

Referring to FIG. 16, the UE may include a transceiver 1610, a controller 1620, a storage 1630, and a display 1640. In the disclosure, the controller may be defined as a circuit or application-specific integrated circuit or at least one processor.

The transceiver 1610 may transmit and receive signals to/from other network entities. The transceiver 1610 may receive data of a predicted AR image from, e.g., a server.

The controller 1620 may control the overall operation of the terminal according to an embodiment. For example, the controller 1620 may control inter-block signal flow to perform the operations according to the above-described flowchart. Specifically, the controller 1620 may control the operations of the AR content processing procedure described above with reference to FIGS. 1 to 15.

The storage 1630 may store at least one of information transmitted/received via the transceiver 1610 and information generated via the controller 1620. For example, the storage 1630 may store information and data for AR content processing described above with reference to FIGS. 1 to 15.

The display 1640 may display at least one of information transmitted/received through the transceiver and information generated through the controller. For example, the display may display XR/AR data.

Figure 17:
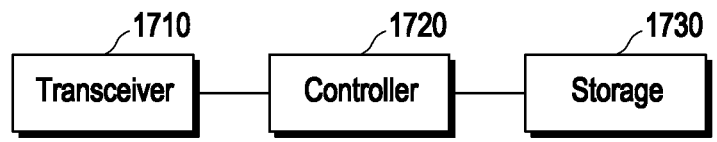
FIG. 17 is a view illustrating a structure of a server according to an embodiment of the disclosure.

FIG. 17 is a view illustrating a structure of a server according to an embodiment of the disclosure. A UE having the structure of FIG. 17 may be, e.g., the server of FIG. 2.

Referring to FIG. 17, the server may include a transceiver 1710, a controller 1720, and a storage 1730. In the disclosure, the controller may be defined as a circuit or application-specific integrated circuit or at least one processor.

The transceiver 1710 may transmit and receive signals to/from other network entities. The transceiver 1710 may receive data of a predicted AR image from, e.g., a server.

The controller 1720 may control the overall operation of the server according to an embodiment. For example, the controller 1720 may control inter-block signal flow to perform the operations according to the above-described flowchart. Specifically, the controller 1720 may control the operations of the AR content processing procedure described above with reference to FIGS. 1 to 15.

The storage 1730 may store at least one of information transmitted/received via the transceiver 1710 and information generated via the controller 1720. For example, the storage 1730 may store information and data for AR content processing described above with reference to FIGS. 1 to 15.

Figure 18:
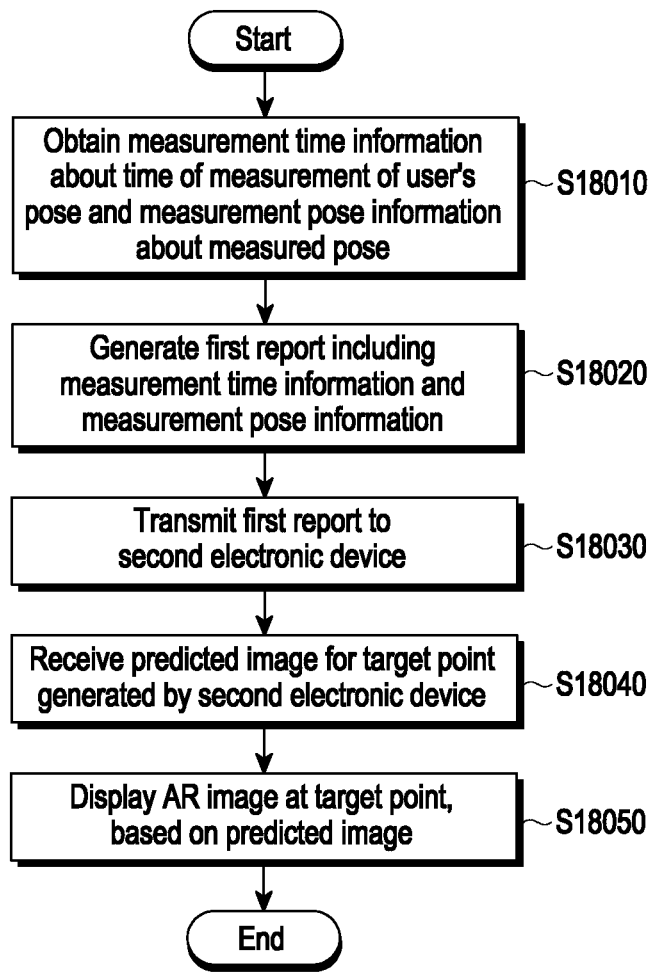
FIG. 18 illustrates a method for operating a first electronic device according to an embodiment of the disclosure.

FIG. 18 illustrates a method for operating a first electronic device according to an embodiment of the disclosure. In the embodiment of FIG. 18, the first electronic device may be an electronic device (e.g., UE1 of FIG. 2) that displays AR content. In relation to FIG. 18, no duplicate description is given of those described above in connection with FIGS. 1 to 17.

Referring to FIG. 18, the first electronic device may obtain measurement time information for a time at which a pose of the user wearing the first electronic device is measured and measurement pose information for the measured pose (S18010). Here, the measurement pose information may include information about the user's location and gazing direction.

The first electronic device may generate a first report including the measurement time information and measurement pose information (S18020).

The first electronic device may transmit the first report to a second electronic device (S18030).

The first electronic device may receive a predicted image for the target time/target point generated by the second electronic device (S18040). The predicted image for the target time/target point may be generated based on the first report.

The first electronic device may display an AR image at the target time/target point based on the predicted image (S18050).

As an embodiment, the first report may further include capability information related to the processing time of the first electronic device. The capability information may be, e.g., the UE1 capability report of FIG. 6.

As an embodiment, the first report may further include information for reporting an operation result associated with a previous AR image displayed before displaying the AR image. The information for reporting the operation result may be, e.g., the UE1 last RTT report of FIG. 6.

As an embodiment, the information for reporting the operation result may include at least one of information about the pose used to display a previous AR image, information about the time at which the pose was measured, and information about the time when the first electronic device received the previous predicted image associated with the previous AR image, or information about the time when the previous AR image was displayed.

Figure 19:
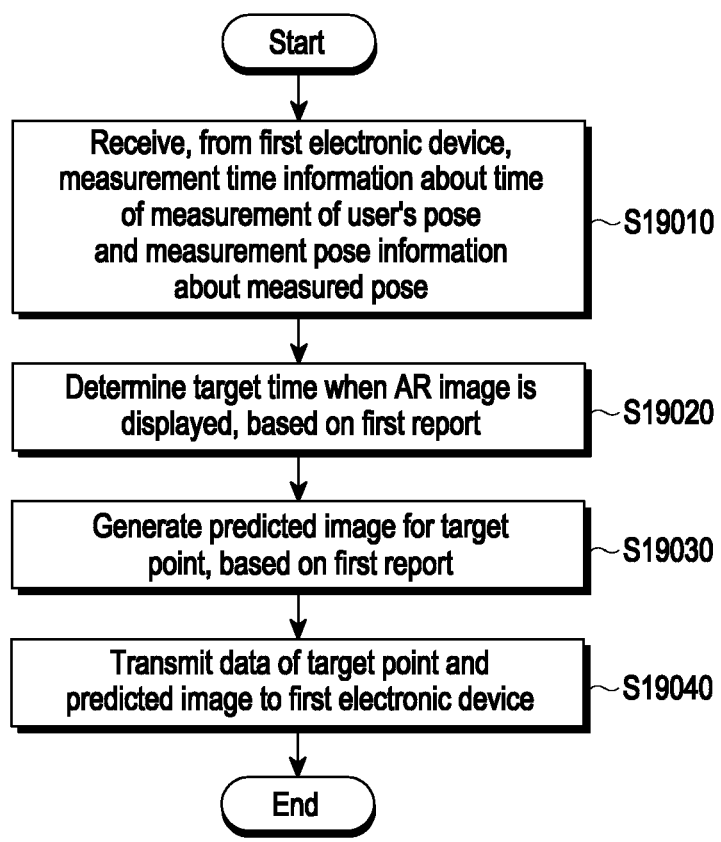
FIG. 19 illustrates a method for operating a second electronic device according to an embodiment of the disclosure.

FIG. 19 illustrates a method for operating a second electronic device according to an embodiment of the disclosure. In the embodiment of FIG. 19, the second electronic device may be an electronic device (e.g., the server of FIG. 2) that renders AR content. In relation to FIG. 19, no duplicate description is given of those described above in connection with FIGS. 1 to 17.

Referring to FIG. 19, the second electronic device may receive, from the first electronic device, a first report including the measurement time information about the time when the user's pose was measured and the measurement pose information about the measured pose (S19010). Here, the measurement pose information may include information about the user's location and gazing direction.

The second electronic device may determine the target time/target point when/where the AR image is displayed based on the first report (S19020).

The second electronic device may generate a predicted image for the target time/target point based on the first report (S19030).

The second electronic device may transmit data of the target time/target point and the predicted image to the first electronic device (S19040).

As an embodiment, the first report may further include capability information related to the processing time of the first electronic device. The capability information may be, e.g., the UE1 capability report of FIG. 6.

As an embodiment, the first report may further include information for reporting an operation result associated with a previous AR image displayed before displaying the AR image. The information for reporting the operation result may be, e.g., the UE1 last RTT report of FIG. 6.

As an embodiment, the information for reporting the operation result may include at least one of information about the pose used to display a previous AR image, information about the time at which the pose was measured, and information about the time when the first electronic device received the previous predicted image associated with the previous AR image, or information about the time when the previous AR image was displayed.

The embodiments herein are provided merely for better understanding of the present disclosure, and the present disclosure should not be limited thereto or thereby. In other words, it is apparent to one of ordinary skill in the art that various changes may be made thereto without departing from the scope of the present disclosure. Further, the embodiments may be practiced in combination.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a first electronic device configured to display augmented reality (AR) content, the method comprising:
obtaining measurement time information associated with a time when a pose of a user wearing the first electronic device is measured and measurement pose information associated with the measured pose of the user, the measurement pose information including a location and gazing direction of the user;
generating a first report including the measurement time information and the measurement pose information;
in case that the first electronic device is connected with a third electronic device, transmitting the first report via the third electronic device to a second electronic device;
receiving, from the third electronic device, data associated with predicted image and a target point generated by the second electronic device, the predicted image for the target point being generated based on the first report; and
displaying an AR image based on the data associated with the predicted image and the target point, wherein the first report further includes capability information related to an image processing time of the first electronic device,
wherein the first report is included in a second report generated by the third electronic device and is transmitted to the second electronic device by the third electronic device, and
wherein the second report includes capability information related to an image processing time of the third electronic device and information associated with a time of transmission of the second report.

2. The method of claim 1, further comprising receiving, from the second electronic device, additional information associated with the predicted image for correcting the predicted image.

3. The method of claim 2, further comprising correcting the predicted image based on the additional information to generate the AR image.

4. The method of claim 1, wherein the first report further includes information for reporting an operation result associated with a previous AR image displayed before the AR image is displayed.

5. The method of claim 4, wherein the information for reporting the operation result includes at least one of information associated with a previous pose used to display the previous AR image, information associated with a time when the previous pose is measured, information associated with a time of reception of a previous predicted image associated with the previous AR image by the first electronic device, or information associated with a time when the previous AR image is displayed.

6. The method of claim 1, wherein:
the capability information related to the image processing time of the first electronic device includes at least one of:
processing capability information associated with a decoder of the first electronic device, or
processing capability information associated with a reprojector of the first electronic device; and
capability information related to an image processing time of the second electronic device includes at least one of:
processing capability information associated with a decoder of the second electronic device, or
processing capability information associated with a reprojector of the second electronic device.

7. A method performed by a second electronic device configured to render augmented reality (AR) content, the method comprising:
in case that a first electronic device is connected with a third electronic device, receiving, via a third electronic device from the first electronic device, a first report including measurement time information associated with a time when a pose of a user wearing the first electronic device is measured and measurement pose information associated with the measured pose, the measurement pose information including a location and gazing direction of the user;

determining, based on the first report, a target point when an AR image is displayed;

generating, based on the first report, a predicted image for the target point; and transmitting, to the third electronic device, the predicted image and the target point, wherein the first report further includes capability information related to an image processing time of the first electronic device, wherein the first report is included in a second report generated by the third electronic device and is transmitted to the second electronic device by the third electronic device, and wherein the second report includes capability information related to an image processing time of the third electronic device and information associated with a time of transmission of the second report.

8. The method of claim 7, further comprising transmitting, to the first electronic device, additional information associated with the predicted image for correcting the predicted image.

9. The method of claim 7, wherein the first report further includes information for reporting an operation result associated with a previous AR image displayed before the AR image is displayed.

10. The method of claim 9, wherein the information for reporting the operation result includes at least one of information associated with a previous pose used to display the previous AR image, information associated with a time when the previous pose is measured, information associated with about a time of reception of a previous predicted image associated with the previous AR image by the first electronic device, or information associated with a time when the previous AR image is displayed.

11. The method of claim 7, wherein:
the capability information related to the image processing time of the first electronic device includes at least one of:
processing capability information associated with a decoder of the first electronic device, or
processing capability information associated with a reprojector of the first electronic device; and
capability information related to an image processing time of the second electronic device includes at least one of:
processing capability information associated with a decoder of the second electronic device, or
processing capability information associated with a reprojector of the second electronic device.

12. A first electronic device configured to display AR content, comprising:
a transceiver;
a display; and
a controller connected with the transceiver and the display, the controller configured to:
obtain measurement time information associated with a time when a pose of a user wearing the first electronic device is measured and measurement pose information associated with the measured pose of the user, the measurement pose information a a location and gazing direction of the user;
generate a first report including the measurement time information and the measurement pose information;
in case that the first electronic device is connected with a third electronic device, transmit the first report via the third electronic device to a second electronic device;
receive, from the third electronic device, data associated with predicted image and a target point generated by the second electronic device, the predicted image for the target point generated based on the first report; and
display an AR image based on the data associated with the predicted image and the target point,
wherein the first report further includes capability information related to an image processing time of the first electronic device,
wherein the first report is included in a second report generated by the third electronic device and is transmitted to the second electronic device by the third electronic device, and
wherein the second report includes capability information related to an image processing time of the third electronic device and information associated with a time of transmission of the second report.

13. The first electronic device of claim 12, wherein the controller is further configured to receive, from the second electronic device, additional information associated with the predicted image for correcting the predicted image.

14. The first electronic device of claim 12, wherein the first report further includes information for reporting an operation result associated with a previous AR image displayed before the AR image is displayed.

15. The first electronic device of claim 14, wherein the information for reporting the operation result includes at least one of information associated with a previous pose used to display the previous AR image, information associated with a time when the previous pose is measured, information associated with a time of reception of a previous predicted image associated with the previous AR image by the first electronic device, or information associated with a time when the previous AR image is displayed.

16. A second electronic device configured to render AR content, comprising:
a transceiver;
a display; and
a controller connected with the transceiver and the display, the controller configured to:
in case that afirst electronic device is connected with a third electronic device, receive, via a third electronic device from the first electronic device, a first report including measurement time information associated with a time when a pose of a user wearing the first electronic device is measured and measurement pose information associated with the measured pose, the measurement pose information including a location and gazing direction of the user,
determine, based on the first report, a target point when an AR image is displayed,
generate, based on the first report, a predicted image for the target point, and
transmit, to the third electronic device, the predicted image and the target point,
wherein the first report further includes capability information related to an image processing time of the first electronic device,
wherein the first report is included in a second report generated by the third electronic device and is transmitted to the second electronic device by the third electronic device, and
wherein the second report includes capability information related to an image processing time of the third electronic device and information associated with a time of transmission of the second report.

17. The second electronic device of claim 16, wherein the first report further includes information for reporting an operation result associated with a previous AR image displayed before the AR image is displayed.

18. The second electronic device of claim 17, wherein the information for reporting the operation result includes at least one of information associated with a previous pose used to display the previous AR image, information associated with a time when the previous pose is measured, information associated with a time of reception of a previous predicted image associated with the previous AR image by the first electronic device, or information associated with a time when the previous AR image is displayed.

* * * * *